United States Patent [19]

Pong

[11] Patent Number: 5,212,769
[45] Date of Patent: May 18, 1993

[54] METHOD AND APPARATUS FOR ENCODING AND DECODING CHINESE CHARACTERS

[75] Inventor: Gim Pong, Flushing, N.Y.

[73] Assignee: Pontech, Inc., New York, N.Y.

[21] Appl. No.: 477,327

[22] Filed: Feb. 8, 1990

Related U.S. Application Data

[63] Continuation-in-part of Ser. No. 313,888, Feb. 23, 1989, abandoned.

[51] Int. Cl.$^5$ .............................................. G06F 15/66
[52] U.S. Cl. ...................................... 395/150; 395/151
[58] Field of Search ............... 400/109, 110; 395/150, 395/151; 364/419; 340/730, 735, 748, 751

[56] References Cited

U.S. PATENT DOCUMENTS

| | | | |
|---|---|---|---|
| 4,284,975 | 8/1981 | Odaka | 340/146.3 J |
| 4,365,235 | 12/1982 | Greanias et al. | 400/110 X |
| 4,379,288 | 4/1983 | Leung et al. | 400/110 X |
| 4,462,703 | 7/1984 | Lee | 400/110 X |
| 4,505,602 | 3/1985 | Wong | 400/110 |
| 4,559,615 | 12/1985 | Goo et al. | 400/110 X |
| 4,669,901 | 6/1987 | Feng | 400/110 X |
| 4,684,926 | 8/1987 | Yong-Min | 341/28 |
| 4,689,743 | 8/1987 | Chiu | 400/110 X |
| 4,718,102 | 1/1988 | Crane et al. | |
| 4,718,103 | 1/1988 | Shojima et al. | |
| 4,755,955 | 7/1988 | Kimura et al. | |
| 4,829,583 | 5/1989 | Monroe et al. | 400/110 X |
| 5,109,352 | 4/1992 | O'Dell | 395/150 |

*Primary Examiner*—Heather R. Herndon
*Attorney, Agent, or Firm*—Brumbaugh, Graves, Donohue & Raymond

[57] ABSTRACT

An apparatus and method for encoding and decoding Chinese characters comprises converting the strokes of a Chinese character in a sequence conforming at least initially with the Chinese handwriting rules to a sequence of predefined basic stroke elements of three types and determining the initial order of occurrence and the total number of occurrence of each type of basic stroke element in the character. A multiple element character stroke code indicative of the initial order of occurrence and the total number of occurrence of each of the basic stroke element types in the character is then derived, and each character of a stored character set which corresponds to the character stroke code is displayed, along with a respective additional code element associated with each character being displayed if the character stroke code corresponds to more than one character in the character set. In the event that more than one character corresponding to the character stroke code are being displayed, the additional code element associated with the displayed character that is the same as the character being entered is appended to the character stroke code to obtain an extended character code which uniquely corresponds to the character being entered. The method and apparatus of this invention advantageously allow the user to encode and decode Chinese characters efficiently and rapidly without having to rigorously follow the Chinese handwriting rules to completion.

22 Claims, 12 Drawing Sheets

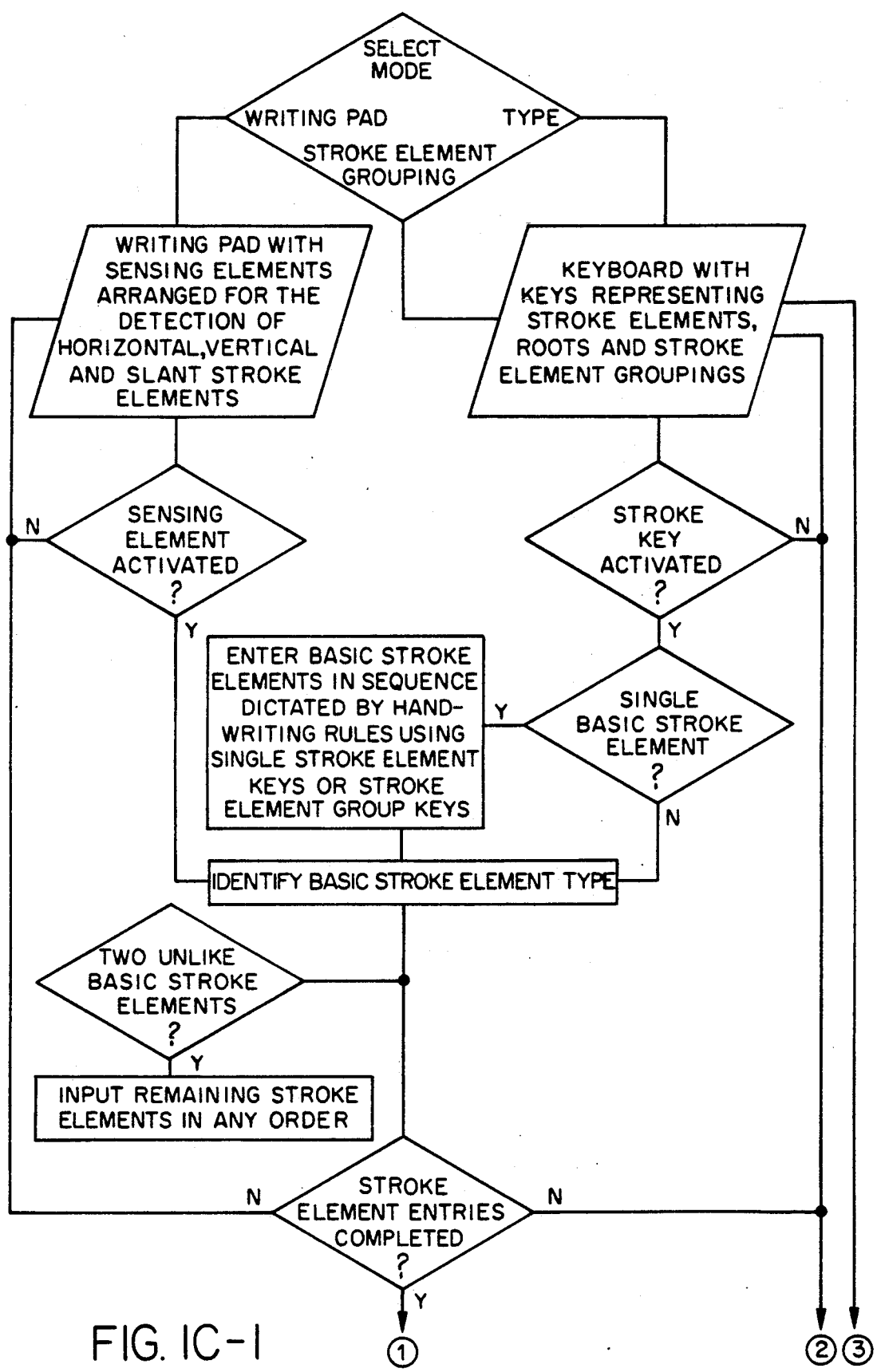
FIG. IC-I

| KEY | STROKE ELEMENT/ROOT/S | CODE | KEY | STROKE ELEMENT/ROOT/S | CODE |
|---|---|---|---|---|---|
| a | 三 | 3-0 1 0 / | x | 刂 | 2 1 0-0 / |
| b | 厂 フ フ | 1-1 / 0 1 | y | 目 且 | 2 1 4-0 / |
| c | 匕 人 | 2 / 0-0 1 | z | 二 | 2-0 1 0 / |
| d | 勹 扌 | 1-1 1 1 / | 1 | 灬 爫 巛 | 4 / 0-0 1 |
| e | 冂 | 2 1 1-1 / | 2 | 爻 幺 | 5 / 0-0 1 |
| f | 尸 王 | 2-1 1 1 / | 3 | 巜 | 6 / 0-0 1 |
| g | 寸 木 オ | 1-1 1 2 / | 4 | 夂 女 夊 | 3 / 1-0 1 |
| h | 言 | 6-2 1 0 / | 5 | 羊 月 | 2 / 3-1 1 |
| i | 虫 | 3 1 2-2 / | 6 | 欠 辶 广 | 4 / 1-0 1 |
| j | 耳 | 3-2 1 1 / | 7 | 禾 | 4 / 1-1 1 |
| k | 重 | 5-3 1 0 / | 8 | 金 | 4 / 3-1 1 |
| l | 焉 馬 | 4-3 1 5 / | 9 | 食 魚 | 5 / 4-2 1 |
| m | 十 丁 | 1-1 1 0 / | 0 | 鳥 | 6 / 4-3 1 |
| n | 上 丿 | 1 1 1 / 0 - | - | 黽 | 6 / 5-3 1 |
| o | 足 | 3 1 3-2 / | = | 丿 | 1 / 0-0 1 |
| p | 田 | 3 1 3-0 / | [ | 山 | 3 1 1-0 / |
| q | 川 | 3 1 0-0 / | ] | l | 1 1 0-0 / |
| r | 口 吐 | 2 1 2-0 / | ; | 一 | 1-0 1 0 / |
| s | 士 土 干 工 | 2-1 1 0 / | , | END | END |
| t | 白 日 | 2 1 3-0 / | . | 小 彳 | 2 / 1 1 0 - |
| u | 貝 | 2 1 4-2 / | , | 心 | 3 / 2 1 1 - |
| v | 彡 氵 厶 | 3 / 0-0 1 | / | 頁 | 5-3 / 2 1 |
| w | 凵 └ | 2 1 1-0 / | | | |

FIG. 12

METHOD AND APPARATUS FOR ENCODING AND DECODING CHINESE CHARACTERS

CROSS-REFERENCE TO RELATED APPLICATION

This application is a continuation-in-part of U.S. patent application Ser. No. 07/313,888, filed Feb. 23 1989, now abandoned.

BACKGROUND OF THE INVENTION

This invention relates to an apparatus and a method for encoding and decoding Chinese characters. More particularly, this invention relates to an apparatus and a method for encoding and decoding Chinese characters wherein a Chinese character is analyzed to determine the initial order of occurrence and the number of occurrence of each of three (3) predefined basic stroke elements into which the strokes of the character are converted in a sequence according to the Chinese handwriting rules, and a multiple element code indicating such initial order and number of occurrences of each of the basic strokes is derived for the character. In most instances, the code derived in the foregoing manner will correspond to more than one character. In such instances, an additional code element is added to the code to obtain an extended code which uniquely defines the character. When used in conjunction with an appropriately programmed computer system, the apparatus and the method of this invention enables rapid and efficient encoding and decoding of Chinese characters, thereby enabling the user to enter, store, display, process, retrieve, print or otherwise output Chinese characters in a variety of applications, such as word processing, electronic dictionary or character verification, printing, electronic publishing and the like.

The Modern Chinese Dictionary 26th Edition), as published by the Commercial Publishing Company, Hong Kong, contains more than 7000 words, each defined by one or more characters. Obviously, a language having such a large number of characters poses difficulties in terms of written communications, especially for those who have not acquired a high level of proficiency in the written Chinese language.

In addition, a single Chinese character may contain from one to over thirty strokes. The order or sequence in which the strokes of a character are written or drawn by hand is dictated by the Chinese handwriting rules which are well known to those skilled in the written Chinese language. Furthermore, to achieve a uniform appearance in printed or written characters, the vertical and lateral dimensions of each character should be approximately the same regardless of the number of strokes in the character. For example, the Chinese character for the word for "sun" (日) has four strokes, and the Chinese character for the word for "chicken"

has 20 strokes. However, these two words when printed or written must ordinarily have the same vertical and lateral dimensions. Therefore, the strokes for the character

must necessarily be smaller than those for the character (日) when those characters appear in the same body of text. In other words, different Chinese characters in the same body of text may require different stroke sizes. This requirement presents a further problem in the creation of a system for encoding and decoding Chinese characters.

Various systems for encoding and decoding Chinese characters have previously been suggested. For example, U.S. Pat. No. 4,559,615 to Goo et al. discloses a method and an apparatus for encoding, storing and accessing Chinese characters, in which the Chinese characters are analyzed in part according to the so-called "Four Corner Coding Method" to obtain a 7-digit code number corresponding to each character. However, the Four Corner Coding Method is complex, and therefore the method disclosed in Goo et al. is difficult to apply if the character being analyzed does not contain a clear-cut radical or if the corner strokes of the character are not well defined. It would therefore be desirable to have a technique for encoding and decoding Chinese characters which does not have the complexity and problems associated with the Four Corner Coding Method.

Accordingly, it is one object of this invention to provide for encoding and decoding of Chinese characters without using the Four Corner Coding Method. It is a feature of this invention that the strokes of a Chinese character are converted into basic stroke element of three (3) predefined types, the conversion taking place in a sequence determined at least in part by the Chinese handwriting rules The characters may be represented by a multiple element code indicative of the initial order of occurrence of each of the different types of basic strokes and the total number of occurrence of each type of basic stroke in the character being encoded. In some instances, an additional code element is added to such code to obtain an extended code which uniquely corresponds to the character being encoded.

U.S. Pat. No. 4,718,103 to Shojima et al., U.S. Pat. No. 4,718,102 to Crane et al. and U.S. Pat. No. 4,284,975 to Odaka are each directed to the use of pattern recognition techniques to encode and decode Chinese characters. However, to employ the techniques of Shojima et al., Crane et al., or Odaka, the user is required to enter graphical patterns of the characters or their stroke components, which are then matched against pre-stored templates or reference patterns for a set of characters or stroke components. Furthermore, entry of graphical patterns, typically through a stroke registration device, is often difficult to accomplish, since the level of skill in writing Chinese characters and the writing stroke style may vary from user to user.

Similarly, U.S. Pat. No. 4,829,583 to Monroe et al. and U.S. Pat. No. 4,755,955 to Kimura et al. disclose the encoding and decoding of ideographic characters using coordinate values related to the strokes of the characters being encoded or decoded. However, the techniques disclosed are difficult to use and highly dependent upon the user's skill in determining the coordinates of the strokes of Chinese characters as normally written, since the stroke coordinates which are entered for a character must closely match the stroke coordinates of stored reference characters. It would therefore be desirable to have a technique for encoding and decoding Chinese characters which does not require the user to have a high level of skill in the written Chinese language and which avoids the matching of the stroke patterns or stroke coordinates of an encoded character with stored stroke patterns or stroke coordinates of reference characters.

Accordingly, it is another object of this invention to provide an apparatus and a method for encoding and decoding Chinese characters which do not require the user to possess a high level of skill in the written Chinese language and which is not based on the matching of stroke patterns or stroke coordinates of a character being encoded with those of reference characters.

U.S. Pat. No. 4,462,703 to Lee and U.S. Pat. No. 4,379,288 to Leung et al. are both directed to techniques for using a conventional keyboard to represent the component strokes and roots of Chinese characters. These techniques require a user to strictly follow the stroke sequences of characters dictated by the Chinese handwriting rules in encoding the characters. Similarly, U.S. Pat. No. 4,689,743 to Chiu discloses a technique for encoding and validating an ideographic character, such as a Chinese character. To encode a character, Chiu requires that each component stroke of the character be entered into the Chiu apparatus in the correct sequence according to established handwriting rules for such characters. However, this is difficult to accomplish for a user who does not possess a high level of proficiency in the writing of ideographic characters. It would therefore be desirable to provide a technique for encoding and decoding ideographic characters, such as Chinese characters, which does not require the user to know the proper sequence of every stroke of a character being encoded.

It is another object of this invention to provide an apparatus and method for encoding and decoding Chinese characters in which the stroke sequence of the Chinese handwriting rules need not be rigorously followed except for the first few strokes of the character being encoded or entered. It is a feature of this invention that the conversion of the strokes of a character being encoded to predefined basic stroke elements of three types need follow the sequence dictated by the Chinese handwriting rules only until two different types of basic stroke elements have been encoded. Thereafter, any remaining strokes of the character may be converted to the basic stroke elements in any arbitrary sequence. In this manner, rapid entry and retrieval of Chinese characters to and from a database system may be achieved by a user having a relatively low level of skill in the written Chinese language.

U.S. Pat. No. 4,669,901 to Feng and U.S. Pat. No. 4,684,926 to Yong-Min also disclose using keyboard means for encoding or entering Chinese characters. The Yong-Min technique uses five basic strokes and selects roots according to their frequency of occurrence distribution. The Feng system includes a keyboard having keys representing selected strokes, and combinations of strokes, radicals and other character components. However, neither Feng nor Yong-Min discloses a technique for encoding or decoding Chinese characters in which the characters are first wholly or partially converted into a sequence of predefined basic stroke elements types, and the encoding or entering of characters based on such conversion.

It is another object of this invention to provide an apparatus and method for encoding and decoding Chinese characters which do not require determining stroke frequency or stroke combinations of a character for purposes of encoding and decoding the characters. This invention advantageously enables encoding and decoding by means of determining the initial order of occurrence and number of occurrences of only three basic stroke element types for each character whose strokes are being converted into basic stroke elements of the three types.

It is yet another object of this invention to provide a method and apparatus for encoding and decoding Chinese characters which enable rapid and efficient entry, storage and retrieval of characters from a database system.

Other objects, features and advantages of this invention will be apparent from the following detailed description of exemplary embodiments, together with the accompanying Figures.

SUMMARY OF THE INVENTION

In accordance with the invention, the strokes of a Chinese character are each converted into a horizontal basic stroke element—, a vertical basic stroke element |, a non-horizontal and non-vertical basic stroke element which is referred to as a slant basic stroke element /, or a sequence of such basic stroke elements. Such conversion occurs in a sequence conforming at least in part with well established Chinese handwriting rules. A character stroke code indicative of the initial order of occurrence and the number of occurrence of each type of basic stroke element in the character is derived, such code having multiple code elements. Each character corresponding to the character stroke code is then retrieved from a pre-stored character set and caused to be displayed. Where more than one character corresponding to the character stroke code are being displayed, a respective additional code element associated with each displayed character is also displayed. If this occurs, the user selects from the displayed characters the character which is being encoded or entered and appends the additional code element associated with the selected character to the character stroke code to obtain an extended code which uniquely defines the character being encoded or entered.

An exemplary embodiment of the invention comprises an appropriately programmed computer having a mass storage device, a keyboard, an optional writing pad, a CRT or equivalent display device, and a graphics printer or equivalent hard-copy output device. The computer is programmed to permit, among other functions, the encoding or entry of Chinese characters through the keyboard or writing pad, as well as storing, displaying, processing, and decoding or retrieving of the characters or codes entered into or stored in the computer. The keyboard is used to enter data pertaining to the initial order or sequence of occurrence and the total number of occurrence of each type of basic stroke element, to enter the additional code element corresponding to a character being displayed, and for controlling the computer and its program. The writing pad may be used for direct entry of the strokes of a character by drawing the actual strokes of the character on the surface of the writing pad at least initially in the sequence dictated by the Chinese handwriting rules. The program responds to the strokes of the character being drawn on the writing pad surface by converting each stroke into a respective basic stroke element or a respective sequence of basic stroke elements to derive a character stroke code indicative of the initial order of occurrence and the total number of occurrences of each type of basic stroke in the character. Each character corresponding to the character stroke code is then retrieved from the character set stored in the computer memory and displayed on the CRT screen along with the additional code element associated with displayed character if the character stroke code corresponds to more than one character in the stored character set. If more than one character is being displayed, the user selects from the displayed characters the character being encoded and enters with the keyboard the additional code element associated with the selected character. The encoded characters entered into the computer may be stored and later retrieved and decoded for display, processing or printing by the printer.

The apparatus and method of this invention enable rapid and efficient encoding and decoding of Chinese characters by a user having only a relatively low level of proficiency in the written Chinese language. In accordance with the invention, the user, in order to encode or decode a character, need only know the order of first occurrence of two different types of the three basic stroke element types, when the strokes of the character are converted to the basic stroke elements in the sequence dictated by the Chinese handwriting rules, and the remaining strokes of the character may be encoded in any order without regard to such handwriting rules.

BRIEF DESCRIPTION OF THE DRAWINGS

FIG. 6 is a plan view of the keyboard of the system of FIG. 1A and the labeling of the keys thereof;

FIG. 10 is a table depicting examples of complex strokes used in Chinese characters, examples of how each such complex stroke is used in a Chinese character, and the conversion of each such complex stroke to a sequence of basic stroke elements in accordance with the invention;

FIG. 11 is a table depicting examples of compound strokes used in Chinese characters, examples of how each such compound stroke is used in a Chinese character, and the conversion of each such compound strokes to a sequence of basic stroke elements in accordance with the invention;

FIG. 12 is a table illustrating the assignment of stroke elements, roots and stroke element groupings, and their corresponding stroke codes to the keys of a standard alphanumeric keyboard as used in the system of FIG. 1A;

DETAILED DESCRIPTION OF THE PREFERRED EMBODIMENTS

The apparatus and method of this invention will become apparent from the following detailed description.

Figure 1:
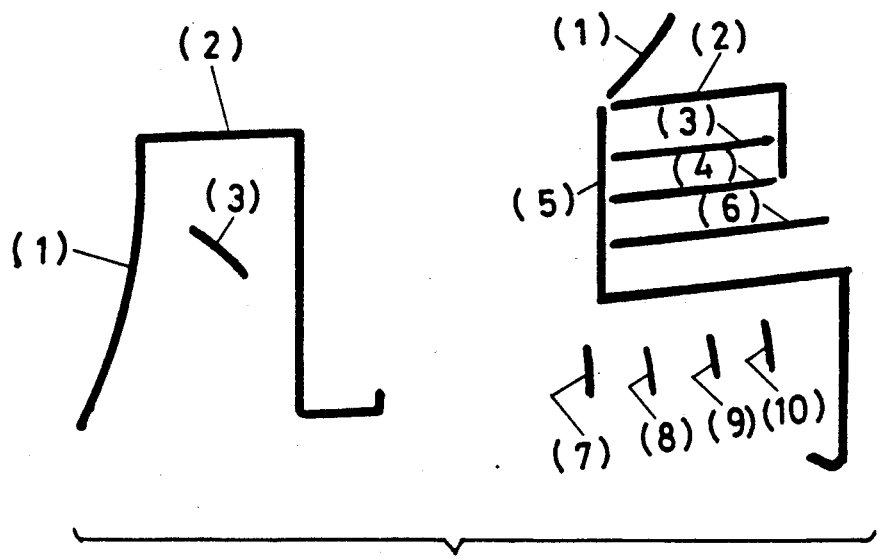
FIG. 1 illustrates examples of the stroke sequence of Chinese characters written according to well established Chinese handwriting/rules.

The term "stroke" as used in the specification and claims (except when used in the expression "compound stroke") refers to a component of a Chinese character which can be completely drawn or written without lifting the writing instrument from the surface on which the character is being written. For example, as shown in FIG. 1, the Chinese character for the word "ordinary" (凡) has 3 strokes, and the Chinese character for the word "bird"

(鳥)

has 10 strokes.

The Chinese handwriting rules referred to in the specification and claims are the well-established handwriting rules taught in Chinese elementary or grade schools. These handwriting rules are referred to and generally described in U.S. Pat. No. 4,505,602 to Wong, which is incorporated herein by reference. In brief summary, and without intending to convey any limitations or restrictions, it may be stated that in applying the Chinese handwriting rules, one generally starts from the left to right or top to bottom of a character. If the character has the same form of strokes on both its left and right sides, the center stroke is drawn first. However, some exceptions to these general rules, as are known to those skilled in the written Chinese language, do exist.

In this invention, the strokes of a Chinese character are converted to the basic stroke elements, at least initially in the stroke sequence according to the Chinese handwriting rules, and the order in which different types of basic stroke elements first occur and the total number of occurrence of each type of basic stroke element in the character are determined. As used in the specification and claims, the term "basic stroke elements" refers to the following three stroke elements: a horizontal stroke element—, a vertical stroke element |, and a stroke element which is neither a horizontal nor a vertical stroke element, the Latter basic stroke element will hereinafter be referred to in the specification and claims as a slant stroke element /. Each stroke in a character must first be converted to one or more of the three basic stroke elements or a sequence of such basic strokes as will be further explained below. Analysis of a character to determine the number, type and sequence of basic stroke elements is done without regard to the complexity of the character. Thus the number of basic stroke elements contained in a given character is not a limitation upon the utility of this invention.

Figure 9:
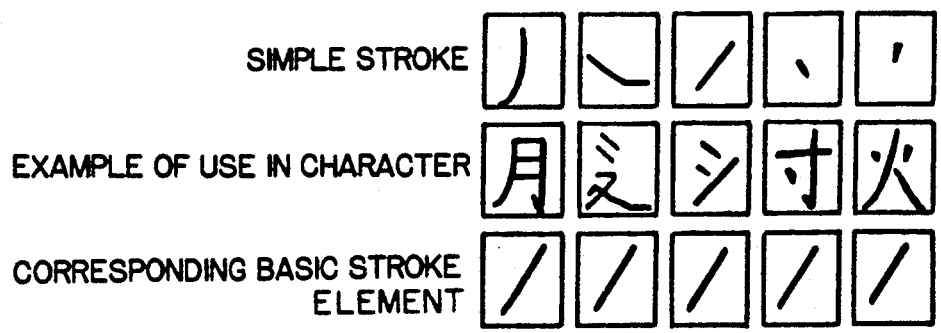
FIG. 9 is a table depicting some other commonly used simple strokes, examples of how each such stroke is used in a character, and the correspondence of each such stroke to the basic slant stroke element.

In accordance with this invention, if a particular stroke, or a portion thereof in a character is not generally in the form of a substantially horizontal line or a substantially vertical line, it is deemed to be a basic slant stroke element /. Thus, as shown in FIG. 9, various non-horizontal or non-vertical strokes, or stroke portions, such as a back-slant \, a short slant ', a short back-slant ' and a curved stroke ) are considered basic slant stroke elements /. Each stroke of a character which corresponds to a single one of the three types of basic stroke elements is referred to as a "simple stroke".

Figure 8:
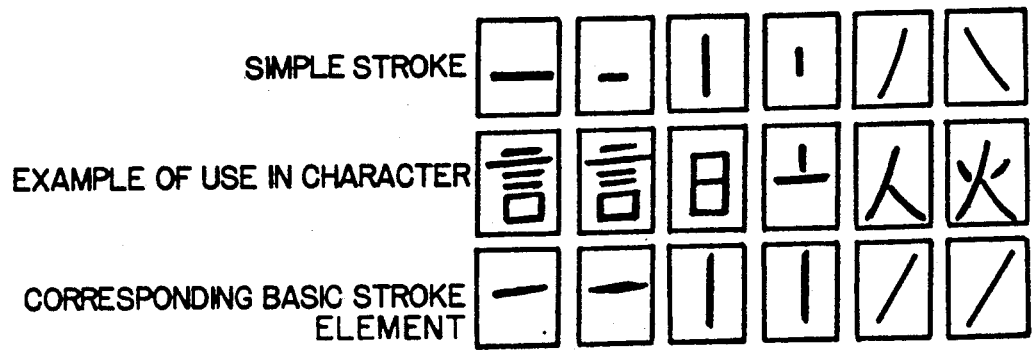
FIG. 8 is a table depicting some commonly used simple strokes, an example of how each stroke is used in a character, and the correspondence of each stroke to a basic stroke element in accordance with the invention.
Figures 10, 11:
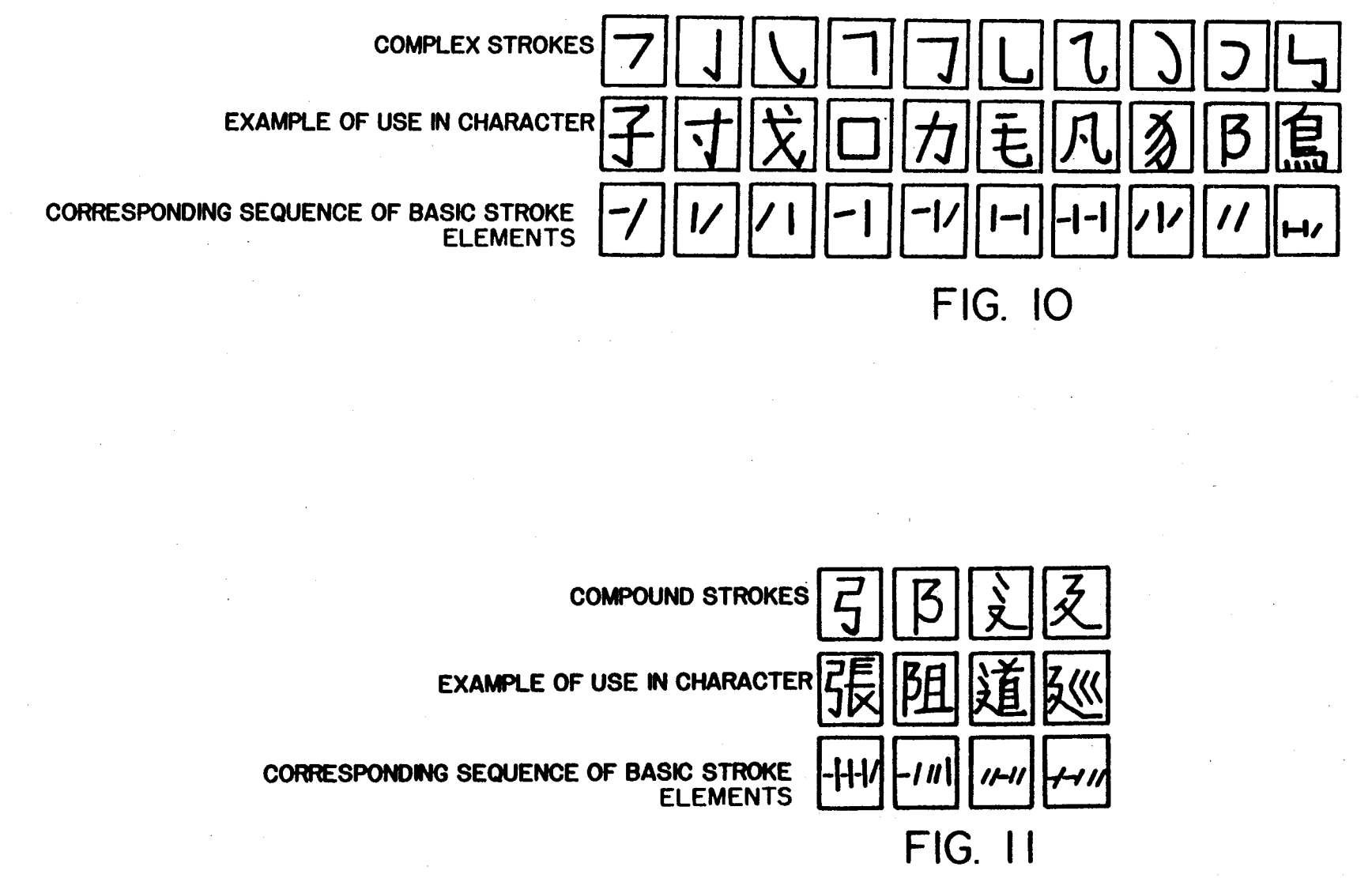

Many Chinese characters include strokes which do not correspond to single basic stroke element. Such strokes, which are referred to as "complex" strokes, are converted in accordance with the invention into a corresponding sequence of basic stroke elements in the manner shown in FIG. 10 before encoding or decoding of a character having one or more complex strokes is carried out. In addition, many Chinese characters include what are referred to as "compound strokes", which are groups of more than one stroke forming part of a character but which are not complete characters or roots. In accordance with the invention, compound strokes are decomposed into a corresponding sequence of basic stroke elements in the manner shown in FIG. 11 before encoding or decoding of a character having one or more compound strokes is carried out. As used in this description and in the appended claims, all references to conversion of non-horizontal and non-vertical simple stroke portions to basic slant stroke elements, the conversion of complex strokes to sequences of basic stroke elements, and the conversion of compound strokes to sequences of basic stroke elements shall mean conversion as depicted in the examples of FIGS. 9, 8 and 10, respectively.

Determination of the initial order or sequence in which the different types of basic stroke elements (i.e., —, | and /) of a character occur is accomplished by converting the stroke portions of the character, at least initially, in the sequence dictated by the Chinese handwriting rules. Thus, in accordance with the invention, a Chinese character may have one of six possible initial orders of occurrence of the three types of basic stroke elements, i.e., —|/, /—, —/|, /|—, |—/ or |/—. For example, the stroke forming the character for the word "sun" (日) in the sequence conforming to the Chinese handwriting rules are ׀ ㄱ -- -. After these strokes are converted to basic stroke elements in the above-described manner, one obtains the basic stroke element sequence "—|—|—|— , and the initial order of occurrence of different basic stroke element types for the character is "—/. It is noted that the basic slant stroke element / is part of the initial order of occurrence of basic stroke element types for the character 日 even though no strokes which are convertible to a basic slant stroke element or a sequence having a basic slant stroke element is present in the character. For the character for the word "earth" (土), the strokes in the sequence conforming to the Chinese handwriting rules are -|-. When these strokes are converted to basic stroke elements, one obtains the basic stroke element sequence —"—, and the initial order of occurrence of basic stroke element types of —"/. Once again the basic slant stroke / not present in the basic stroke element sequence for the character appears in the initial order of occurrence of basic stroke element types for code format reasons as will be further explained below.

The two characters for "sun" and "earth" are simple characters in that each has a meaning by itself. However, each of these simple characters may also be part of another more complex character. A majority of Chinese characters are formed by combining two or more simple characters. Simple characters used as part of another character are generally referred to as "roots". If a root is located at the beginning of a character, it is sometimes called a "SIDE" symbol (the term "SIDE" referring not to location but rather denoting that the symbol is the first-written part of the character according to the Chinese handwriting rules). For simplicity, as used in the specification and claims, a root which is the first written part of a character, i.e., the SIDE symbol, is referred to as the "ROOT". If a simple character component of a Chinese character is not the first-written part of the character, it is referred to in the specification and claims simply as a "root".

The encoding and decoding techniques according to this invention use three predefined basic stroke elements, as well as ROOTS and roots and the Chinese handwriting rules. An example of the encoding of a character according to the invention is the encoding of the character for "ground" (地). This character combines the ROOT "earth" (土) and the root "also" (也) in the manner shown. The Chinese handwriting rules dictate that the strokes of the ROOT "earth" are drawn in the sequence -|-. The strokes of the root "also" are drawn according to the Chinese handwriting rules in the sequence ㄱ ﻟ ㄴ. When these stroke sequences are converted to basic stroke element sequences, the basic stroke element sequence for the character ( 地 ) after taking into account the fact that the ROOT "earth" is drawn first, is —|— —|/||—/.Therefore, the initial order of occurrence of the different basic stroke element types for the character is—|/. Here the basic slant stroke element/ is actually present in the basic stroke element sequence for the character and is not included as the last to occur basic stroke element type in the initial order of occurrence of basic stroke element types by default.

In another example, a more complex character for "intelligent"

is made up of the ROOT "arrow" (矢), and the roots "mouth" (口) and "sun" (日). According to the Chinese handwriting rules, the ROOT "arrow" has the stroke sequence ʌ-ㅅ ; the root "mouth", which is drawn next, has the basic stroke sequence ׀ㄱ- and the root "sun", which is drawn last, has the stroke sequence ׀ㄱ--. Thus, the stroke sequence for the character for "intelligent" according to the Chinese handwriting rules is as follows:

/- - ʌ ＼  ׀ ㄱ - ׀ ㄱ - -  .

When the strokes for the character for "intelligent" are converted to the basic stroke elements, the following basic stroke element sequence is obtained: /—//- |—|—|—|———, and the initial order of occurrence of the different types of basic stroke elements for the character for "intelligent" is /—|. It is noted from the foregoing examples that only the order of occurrence of the first two different types of basic stroke elements of a character need to be determined in order to obtain the initial order of occurrence of all three types of basic stroke elements in the character.

The total number of occurrences of each different basic stroke element is also used to derive the character stroke code associated with the character being encoded or decoded. Thus, in the foregoing example, the character for "intelligent" consists of three slant stroke elements /, seven horizontal stroke elements—and four vertical strokes |, giving rise to a corresponding character stroke code of 3/7—4| for that character. It is noted that this code is indicative of the initial order (according to the Chinese handwriting rules) in which the different types of basic stroke elements occur in the character for "intelligent" and the total number of occurrence of each type of basic stroke element.

The character stroke code derived in the above-described example may correspond to more than one character of a character set stored in the computer. Thus, after obtaining the character stroke code, it is necessary to examine each character in the stored character set which corresponds to the character stroke code. In the event that the character stroke code corresponds to more than one character in the stored character set, the user must select the character being encoded from the corresponding characters of the stored character set and add to the character stroke code another code element associated with the selected character to obtain an extended character stroke code which uniquely corresponds to the character being encoded. In general, if the character stroke code corresponds to more than one character in the stored character set, the extended character stroke code corresponding to a character being encoded will have one of the following forms: X|Y—Z/*, X|Z/Y—*, Y—X|z/*, Y—Z/X|*, Z/X|*, Z/X|Y—* or Z/Y—X|*, where X is the total number of occurrences of the vertical stroke element |, Y is the total number of occurrences of the horizontal stroke elements —, Z is the total number of occurrences of the slant stroke element /, and * is the additional code element, if any, associated with the character being encoded, as selected from the characters of the stored character set corresponding to the character stroke code derived from stroke analysis.

It is noted that in many instances the character basic stroke element code derived from stroke analysis will uniquely define a character in the stored character set, in which instance only one character will be displayed and the character stroke code uniquely defines the character being encoded without any additional code elements. The examination of characters corresponding to a character basic stroke element code derived by stroke analysis to select the character being encoded and the addition of another code element associated with the selected character in accordance with the invention will be further described below.

By using the above-described character encoding technique, a user need only know the correct stroke sequence according to the Chinese handwriting rules of the first seven (7) strokes of the character being encoded to encode or decode over 90% of the characters in the Modern Chinese Dictionary, and a user need only know the correct stroke sequence according to the Chinese handwriting rules of only the first three (3) strokes of the character being encoded to encode or decode over 80% of the characters in the Modern Chinese Dictionary. In accordance with the invention, once the initial order of occurrence of the different types of basic stroke elements for a character being encoded or decoded is determined, the total number of occurrence of each type of basic stroke element may be determined without further regard to any stroke sequence. Thus, except for very simple characters, the encoding and decoding technique according to the invention does not require a user to know the entire stroke sequence dictated by the Chinese handwriting rules of the character to be encoded or decoded.

Figure 1A:
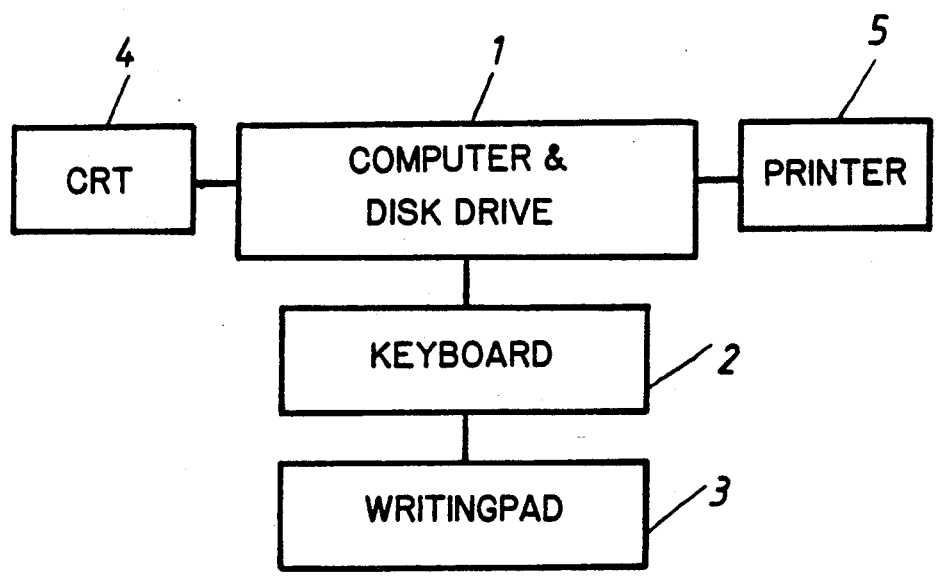
FIG. 1A is a diagram of the hardware components of a system according to an exemplary embodiment of this invention.
Figure 1B:
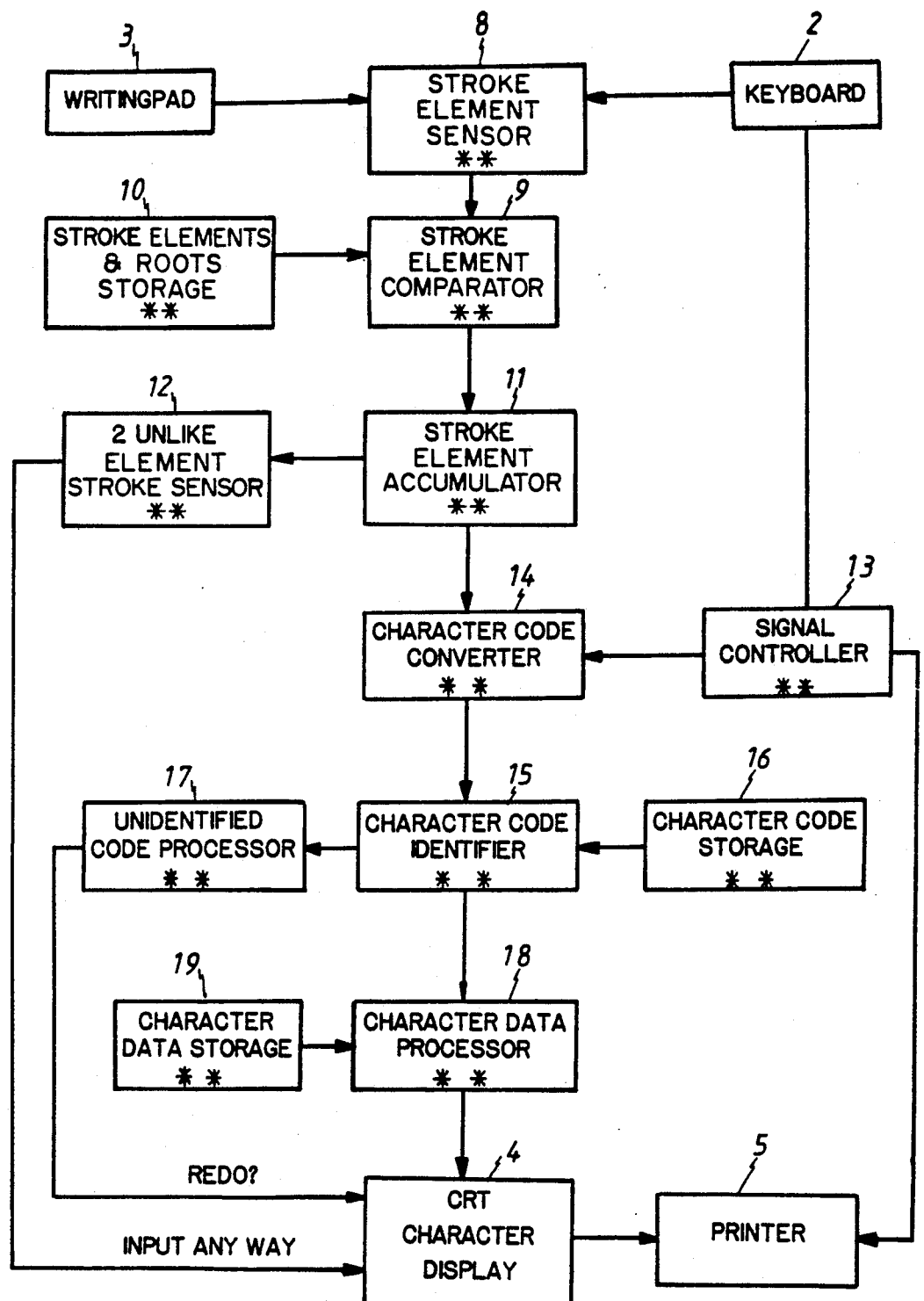
FIG. 1B is a block diagram of the signal flow, as determined by the program of the computer of the system of FIG. 1A, in accordance with the exemplary embodiment.
Figures 1, 1C, 2:
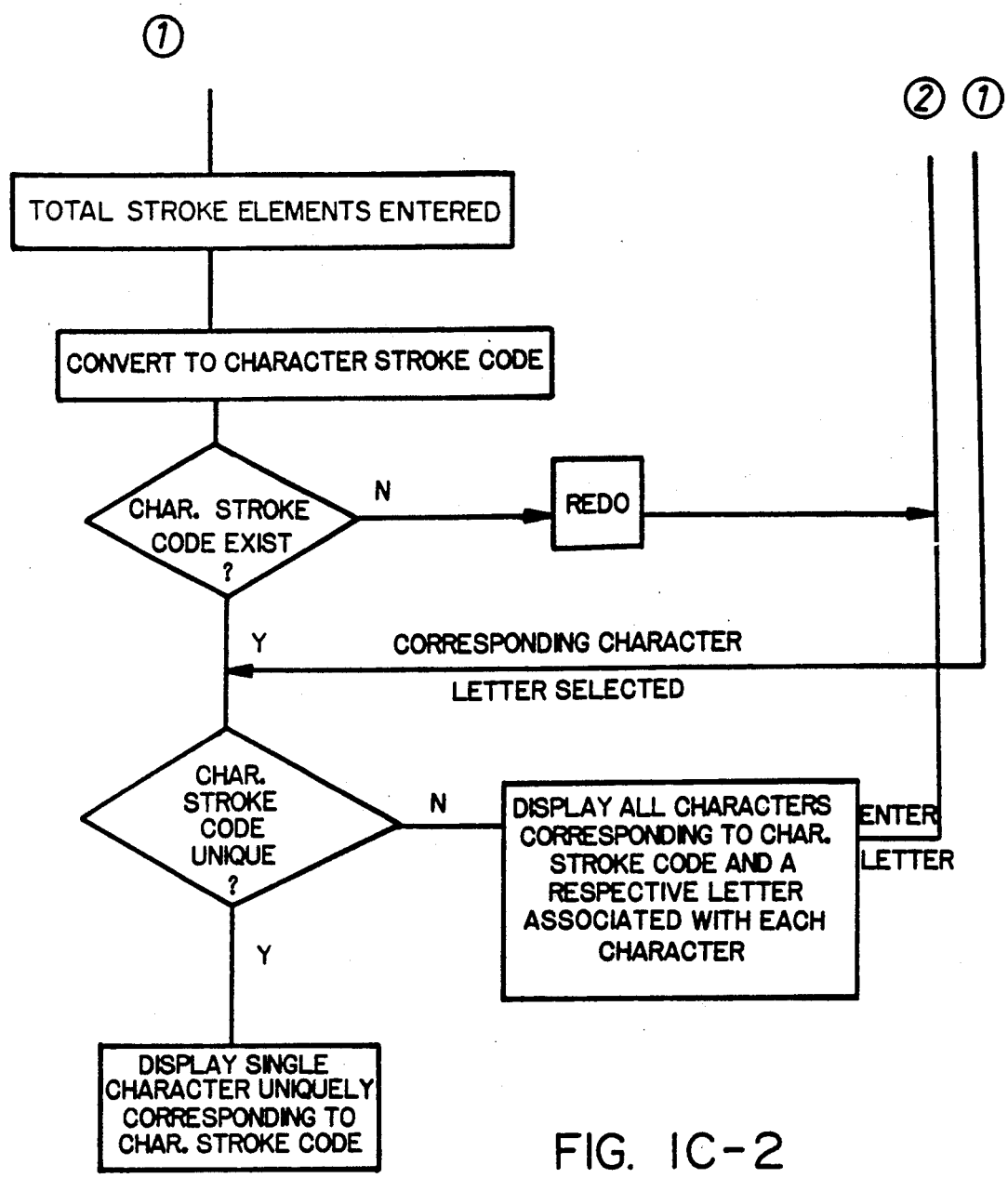
FIG. 1C is a flow diagram representative of a portion of the program of the computer of the system of FIG. 1A, in accordance with the exemplary embodiment.
FIG. 2 is a plan view diagram of the array of sensing elements of the writing pad of the system of FIG. 1A.
Figure 2:
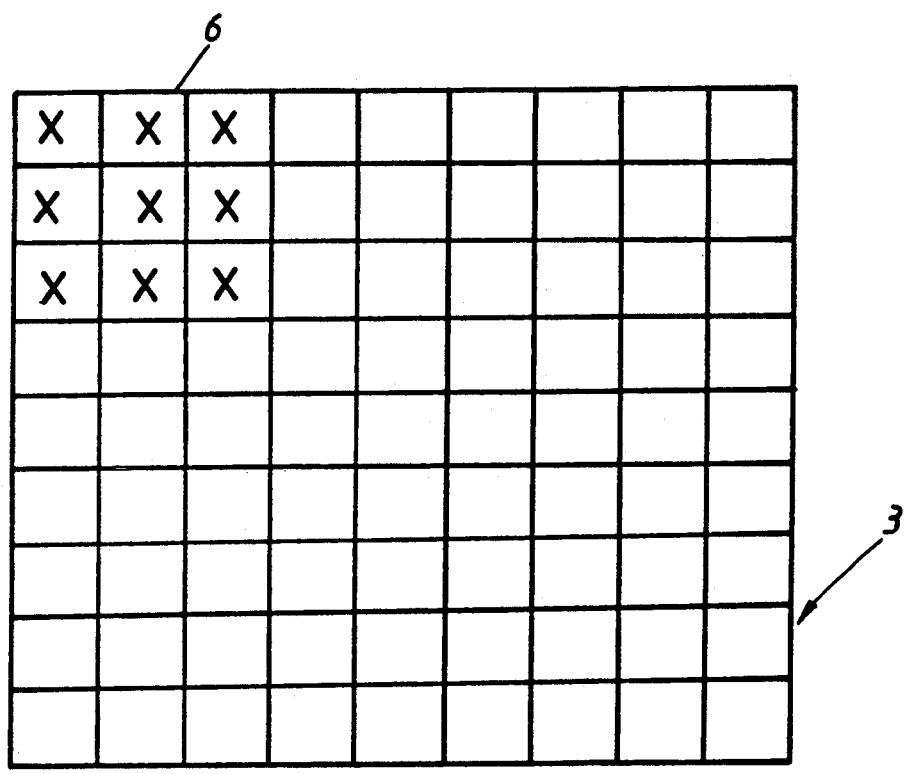

In an exemplary embodiment, the method and apparatus of this invention are employed in conjunction with a computer-based Chinese text entry, processing, storage retrieval, display and output system, as illustrated in FIGS. 1A, 1B and 1C. Referring to FIG. 1A, the system comprises a computer 1 having an integral disk drive, a conventional keyboard 2, an optional writing pad 3, a CRT display 3, and a graphic printer 5. The computer 1 is programmed to control encoding and decoding of Chinese characters in accordance with the invention, as well as to control storing, processing, retrieving and printing of Chinese characters. The keyboard 2 is used to enter data relating to basic stroke elements and to provide control of the functions provided by the program of the computer. The writing pad 3, if employed, is for encoding or entering characters by drawing the strokes of the characters directly thereon. The CRT display 4 is used to provide appropriate displays of characters and codes for interactive encoding, decoding, storage, retrieval, processing and output of Chinese characters, as well as interactive control of system functions. The graphics printer 5 provides hard copy output of characters or codes stored in the computer under the control of the program.

In accordance with the present invention, character data for an appropriate set of Chinese characters consisting of, for example, the graphical pattern data for all the characters in the aforementioned Modern Chinese Dictionary and the character stroke codes corresponding to each character is stored in the memory of the computer 1. Such character data is referred to for simplicity as the "stored character set". It will be understood by those skilled in the art of computer programming that such character data may be incorporated in the computer memory in various ways, such as in the form of a table or as part of the program itself. FIG. 1B details the signal flow in the exemplary embodiment of this invention. The basic stroke elements, ROOTs or roots of a character to be encoded are entered from the writing pad 3 or from the keyboard 2. A stroke sensor 8 detects the input strokes and transfers them to a stroke comparator 9, which compares the input strokes with the strokes or roots stored in the strokes and roots storage 10. As will be further explained below, a character is entered on the keyboard 2 by entering one or more basic stroke elements, complex strokes, compound strokes, and/or roots of the character. As explained above, a root which is entered before any other strokes or roots of a character is referred to as a "ROOT". The entry of basic strokes, complex strokes, compound strokes or roots will all be referred to for simplicity as input strokes. If the input strokes are not found in storage 10, a warning signal (such as a beep) is produced to indicate an incorrect input. If the input strokes are found in storage 10, a strokes comparator 9 provides the strokes to the stroke accumulator 11, which sums up all the input strokes for the character to be encoded. When two or more different basic stroke element types are present in the stroke accumulator 11, a "2 unlike stroke element type sensor" 12 outputs a message "input any way" on the CRT display 4. When this message appears on the CRT screen, the user may enter any remaining input strokes of the character without regard to any stroke sequence.

Upon the completion of the entry of input strokes for the character, the """ key (the END key) on the keyboard 2 is pressed. This causes a completion signal to be sent to a signal controller 13, which in turn activates the character code converter 14. The character converter 14 converts the input strokes into a character code corresponding to the character being encoded. A character code identifier 15 compares the converted character code with the codes stored in the character code storage 16. If the converted character code is not found in storage 16, a message "redo?" is caused to be displayed on the CRT screen 4 by the unidentified code processor 17. If the converted character code is found in storage 16, the character code identifier 15 activates the character data processor 18. The character data processor 18 then retrieves from the character data storage 19 previously stored graphical pattern data of one or more characters having the character code provided by the character code converter 14 and draws each character retrieved on the CRT screen 4. If more than one character is displayed on the CRT screen 4, an additional alphabetic code element associated with each such character is also displayed. In the event that more than one character is displayed, the user selects from the characters being displayed the one which is being encoded, and enters the alphabetic code element associated with the selected character. In this manner, an extended character code which uniquely corresponds to the character being encoded is formed. In the event that the character code as provided by the character code converter 14 uniquely corresponds to a character in storage 16, no alphabetic code element is added to the code to form the character code for the character being encoded.

All characters entered in the foregoing manner are stored in a buffer (not shown) defined by the program. Characters in the buffer may be processed, transferred to a disk in the disk drive, or retrieved for display on the CRT screen 4, processing or printed on the printer 5. The character or characters being displayed on the CRT screen 4 may be printed by the printer 5 by pressing the "print screen" key on the keyboard 2 (not shown in FIG. 6).

Figure 6:
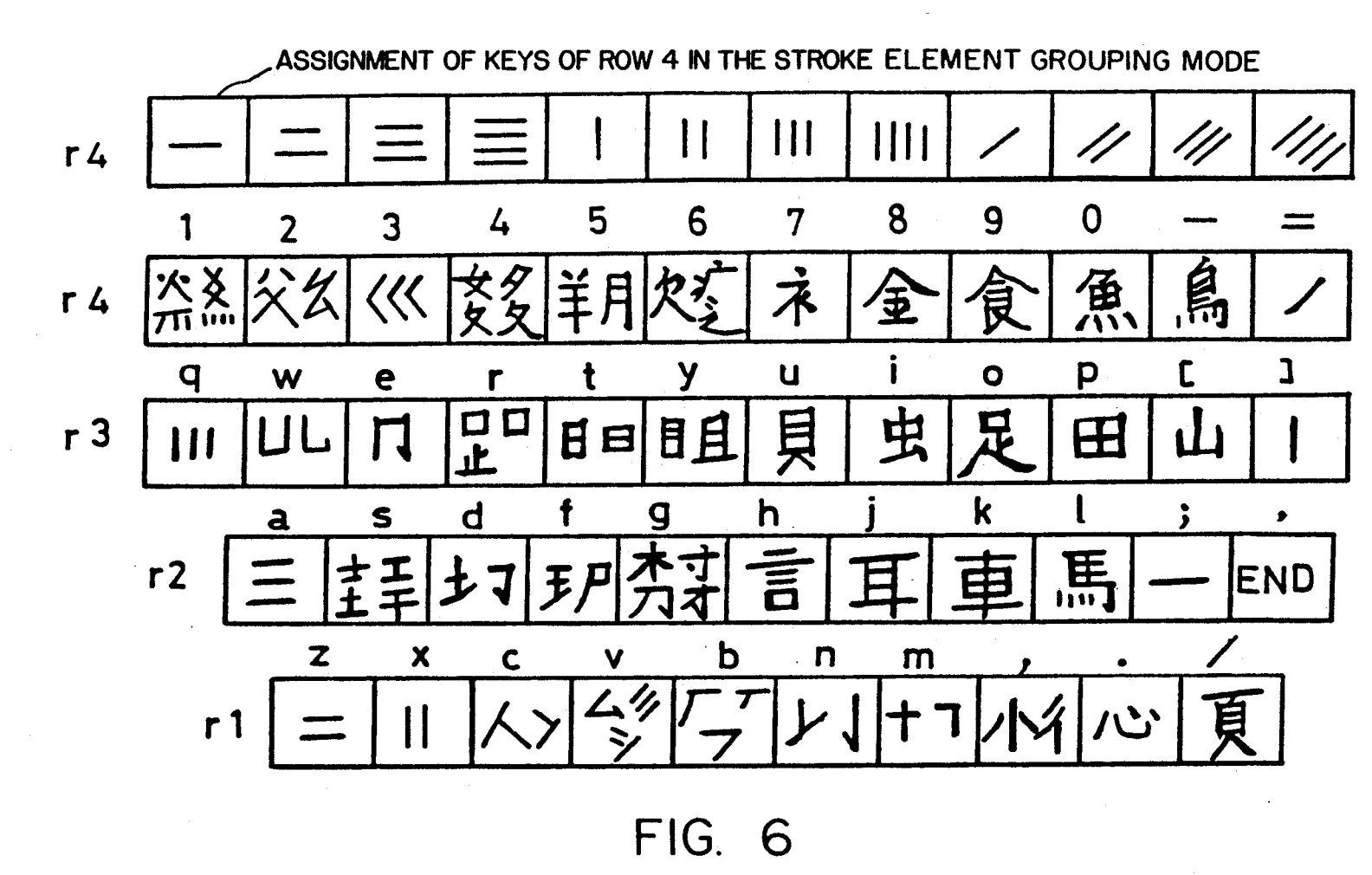

FIG. 1C is a flow diagram (on two sheets) representing the portion of the program of the computer which controls encoding of Chinese characters in accordance with the exemplary embodiment of the invention. Implementation of the program portion defined by the flow diagram of FIG. 1C for a particular computer will be known to one of ordinary skill in the art of computer programming. In the exemplary embodiment of the invention, the program is implemented in the BASIC programming language for a Sanyo Model 17 PLUS personal computer FIG. 6 is a plan view illustrating the labeling of the keys of the keyboard 2 of the exemplary embodiment of this invention. For simplicity of the depiction, certain special purpose and function keys of the keyboard 2 are not shown. It is noted that the keyboard 2 has the same key layout as a standard alphanumeric keyboard used with personal computers, and that basic strokes, complex strokes, compound strokes, roots and basic stroke groupings have been assigned to the various keys by the program. FIG. 12 lists in tabular form the assignment of basic stroke elements, complex strokes, compound strokes and roots to the individual keys (except for the stroke groupings assigned to the top row of keys in the Stroke Grouping Mode) of the keyboard 2 of FIG. 6, and the corresponding stroke codes generated by pressing each of the keys.

There are 214 roots listed on the index page in the Modern Chinese Dictionary. If a separate key on a keyboard were assigned to each root, the keyboard would be impractically large, and a user would spend an inordinate amount of time searching for the roots needed to encode a character. In the exemplary embodiment of the invention, only some frequently used roots, complex strokes, compound stroke elements, each of the basic strokes, and various grouping of each type of basic stroke element are assigned to the different keys of the keyboard 2. Other roots and strokes which are not represented by keys may be entered by using the keys representing the individual basic stroke elements, the keys representing roots and stroke which are "stroke equivalents" with such other roots and strokes, and the keys representing basic stroke element groupings, as will be further described below.

Referring to FIG. 6, except in the Stroke Grouping Mode, the roots and strokes assigned to the fourth row (r4) of keys from the "1" key of the "=" key all have an initial basic stroke order of /—|. The roots and strokes assigned to the third row (r3) of keys from the "q" key to the "]" key have an initial basic stroke order of |—/. The roots and strokes assigned to the second row (r2) of the keys from the "a" key to the """ key have an initial basic stroke order of —|/. The roots and strokes assigned to the first row (r1) of keys from the "z" key to the "/" key have different initial basic stroke orders that may be used for stroke equivalents, as will be explained hereinbelow. Although some keys of the keyboard 2 of FIG. 6 represent more than one root or stroke, the roots or strokes represented by each such key give rise to the same code when depressed. Thus, each such key may be used to enter any one of the roots represented thereby, but the code obtained when such a key is pressed would not uniquely correspond to any of the roots represented by the key. As discussed above and will be further explained below, after completion of input stroke entry there may be displayed on the CRT screen 4 one or more characters corresponding to the character stroke code derived by the program from the input strokes. If more than one character is displayed, each displayed character will have an associated alphabetic letter (i.e., an additional code element) displayed with it. Where more than one character is displayed, the user would select from the displayed characters the one which is being encoded, and enter the letter associated with the selected character to obtain an extended character stroke code which uniquely corresponds to the character being encoded.

As used in the specification and claims, the term "stroke equivalents" means a combination of basic stroke elements, or stroke or a root that is not represented by any key on the keyboard 2, but which has the same number of occurrence of each basic stroke type (but not necessarily the same initial order of occurrence of each basic stroke type) as a stroke or a root that is represented by a key on the keyboard 2. Thus, with the basic stroke elements, complex strokes and compound strokes and roots represented by the keys of the keyboard 2 of FIG. 6, including the groupings of basic strokes represented by the keys in row r4 when the system is in the Stroke Grouping Mode, together with the use of stroke equivalents which may be entered with the same keys, at least all the Chinese characters in the Modern Chinese Dictionary may be encoded and decoded with the keyboard arrangement of FIG. 6.

For example, the Chinese character for the word "sun" (日) has a basic stroke element sequence of |—|—— and has a corresponding character stroke code of 2|3—0/, as previously explained. The Chinese character for the word "right" ( 正 ) has a basic stroke element sequence of —|—|— and a corresponding character stroke code number of 3—2|0/. These two characters are stroke equivalents, but do not have the same corresponding character stroke code because the initial order of occurrence of the basic stroke element types for the two characters are different, although each character contains the same total number of occurrences of each basic stroke element type.

In another example of the use of stroke equivalents, the character for the word "tilt"

( 歪 )

has a ROOT "not"(不) and a root "right" (正). The ROOT "not" is not represented by any key of the keyboard 2, but it may be entered by using the "b" key which according to FIG. 12 represents one—stroke element and one / stroke, and the "n" key which according to FIG. 12 represents one | stroke element and one / stroke element. Thus, the total strokes for the root "not" corresponds to the character stroke code 1—2/1". The root "right" may be entered by using the "t" key which represents the root "sun" (日), because "sun" and "right" are stroke equivalents. It is noted that because the correct initial order of occurrence of the basic stroke element types (i.e., —/|) is established by the entry of the ROOT 不, the order of the remaining basic stroke elements for the character 正 need not be taken into account when entering those stroke elements. Therefore, the root 正 may be entered by entering a stroke equivalent root 日.

According to FIG. 12, the stroke code for the characters represented by the "t" key is 2|3—0/. Therefore, the character stroke code for the character for "tilt" is determined by the initial order of occurrence of the basic stroke element types in the ROOT 不 and the sum of the number occurrences of the basic stroke types in the ROOT "not" and in the root "right", or 4—2/3|. Encoding of the character for "right" alone may be accomplished through the use of stroke equivalents since there is no key on keyboard 2 which represents the initial order of occurrence of the basic stroke element types and the number of occurrence of each basic stroke element type for that character. However, since the character for "right" has three—stroke elements and two | strokes and the initial order of occurrence of those basic stroke types according to the Chinese handwriting rules is —|, the character may be encoded by pressing the "a" key which provides a stroke code of 3—0|0/ in combination with the "x" key which provides a stroke code of 2|0—0/.

Stroke equivalents are advantageously used after two different types of basic stroke elements have been entered. For example, in the above-described encoding of the character for the word "right", pressing the "a" key results in the generation of the stroke code 3—0|0/ having the correct initial order of occurrence of the basic stroke element types for this character, and the subsequent pressing of the "x" key results in the generation of the stroke code 2|0—0/, which when combined with the first stroke code yields the correct character stroke code 3—2|0/ for the character for the word "right". The pressing of any key of the keyboard 2 which represents a root or stroke having more than one type of basic stroke element will cause the program in the computer 1 to output the message "input any way" on the CRT screen 4 to indicate to the user that the remaining strokes of the character may be entered in any sequence without regard to the Chinese handwriting rules.

It is noted that with the exception of the "z", "x", "c", "v", "a", "q", "1", "2" and "3" keys, the roots represented by all other keys in rows r1-r4 of the keyboard of FIG. 6 (in the T mode) each have more than one type of basic stroke element. Therefore, after pressing one of these keys during entry of a character, any remaining strokes in the character may be entered without regard to stroke sequence.

In the exemplary embodiment of the invention, to encode or enter a character having a ROOT and one or more roots, the user first puts the computer in the "T mode" (typing mode) by pressing the "T" key during mode selection. Once in the T mode, the user presses the key representing the ROOT of the character. If the ROOT represented by the pressed key includes two or more basic stroke element types, the user may enter any remaining strokes of the character without regard to stroke sequence, including pressing appropriate keys representing any remaining roots of the character.

However, if the ROOT consists of basic stroke elements of the same type, the program generates a corresponding stroke code which indicates not only the number of occurrences of that basic stroke element, but also a predetermined default order of occurrence of the other basic stroke element types, for example as shown in FIG. 12 for the "a", "c", "q", "v", "x" and "z" keys. Consequently, if the next stroke or root of the character to be entered has a different initial order of occurrence of the basic stroke element types than that of the previously entered ROOT having only one type of basic stroke element, the next root cannot be entered by pressing a key corresponding thereto. Instead, the next root must be decomposed into basic strokes and entered with the basic stroke keys (i.e., the ";", "]" and "=" keys) of the keyboard of FIG. 6 until a basic stroke element of a type different from the one contained in the previously encoded ROOT has been entered. Thereafter, the remaining strokes may be entered in any sequence or manner, including the use of keys representing any remaining roots in the character.

For example, to encode or enter the character for the word "clear" ( 明 ), which has a ROOT 日 and a root 月. The ROOT includes two different types of basic stroke elements, namely, —and |. Therefore, once the ROOT is encoded or entered by pressing the "t" key on the keyboard 2, the remaining strokes of the character may be entered in any manner or sequence, preferably by pressing the key representing the root 月. However, the encoding or entry of the word "oil" ( 油 ) calls for a different entry procedure. This character has a compound stroke ; and a root 由. The compound stroke ; includes only one type of basic stroke element, namely three / strokes. Pressing the "v" key which corresponds to the compound stroke ⼳ causes the program to generate the stroke code 3/0—0| and displays the code on the CRT screen. This code establishes a default initial order of occurrence of the basic stroke element types of /—|, However, the succeeding root 朩 according to the Chinese handwriting rules does not have the same initial order of occurrence the other of two basic stroke element types. Therefore, the root 朩 cannot be entered by pressing the "p" key. The root must instead be decomposed into its basic stroke element sequence |—|—| and entered by first pressing the ㄱ "]" key or "q" key which represents one or three occurrences of the vertical basic stroke elements (i.e., |or |||), respectively, which is the next different basic stroke element type from the one in the compound stroke ⼳. Thereafter, the remaining basic strokes of the root may be entered in any sequence.

The keys of keyboard 2 as depicted in FIG. 6 may be employed to encode or enter Chinese characters by using the stroke grouping keys in row r4 of the keyboard 2 of FIG. 6 when the system is in the Stroke Grouping Mode. As shown in FIG. 6, the stroke grouping keys in row r4 represent 1, 2, 3 or 4 occurrences of each of the three basic stroke element types —|/. To use the stroke grouping keys the user selects the "S" (Stroke Grouping) mode by pressing the "S" key during entry mode selection. This invokes the preprogrammed modules corresponding to each of the stroke grounding keys.

A writing pad 3 may be employed in lieu of or in combination with keyboard 2 for the encoding or entry of Chinese characters. As depicted in FIG. 2, the writing pad consists of a regular array of multiple sensing elements 6, each of which may be individually activated by the user to provide a respective output signal. The sensing elements may be photosensitive, capacitive, magnetic sensing devices, or other devices such as mechanical switches which may be individually activated by the user.

Figure 3:
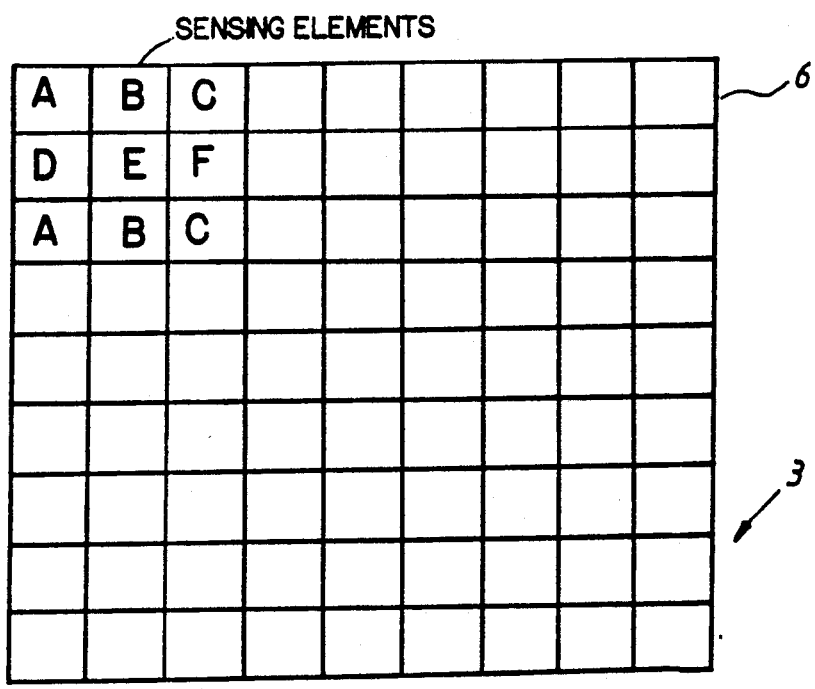
FIG. 3 is a diagram illustrative of the use of the writing pad of the system of FIG. 1A.

As illustrated in FIGS. 2 and 3, the sensing elements are arranged in multiple rows and columns. The connections of these sensing elements are shown, for example, in FIG. 4. In the exemplary embodiment, the sensing elements of the writing pad are each mechanical switches. The switches of the sensing elements labeled A, B, C, D, E and F are connected in parallel with the key switches of the "a", "b", "c", "d", "e" and "f" keys of the keyboard 2, respectively.

Referring to FIG. 3, when the elements A, B and C are activated across the first three columns of the writing pad, the program of the computer 1 detects the output signals produced by the actuation of those sensing elements, as generated by the keyboard, and interprets those signals as a basic horizontal stroke element —. When the sensing elements B, E and B are activated along the second column of the writing pad, the program of the computer 1 detects the output signals produced by the actuation of those sensing elements and interprets those signals as a basic vertical stroke element |. When the sensing elements A, E and C are activated from the first row, first column to third row, third column of the writing pad, the program of the computer 1 detects the output signals produced by the actuation of those sensing elements and interprets those signals as a basic slant stroke element /. In addition, activation of sensing elements C, E and A from the first row, third column to the third row, first column, or the activation of fewer than three contiguous sensing elements, whether vertically, horizontally or diagonally, is also interpreted by the program as a basic slant stroke element /.

Figure 4:
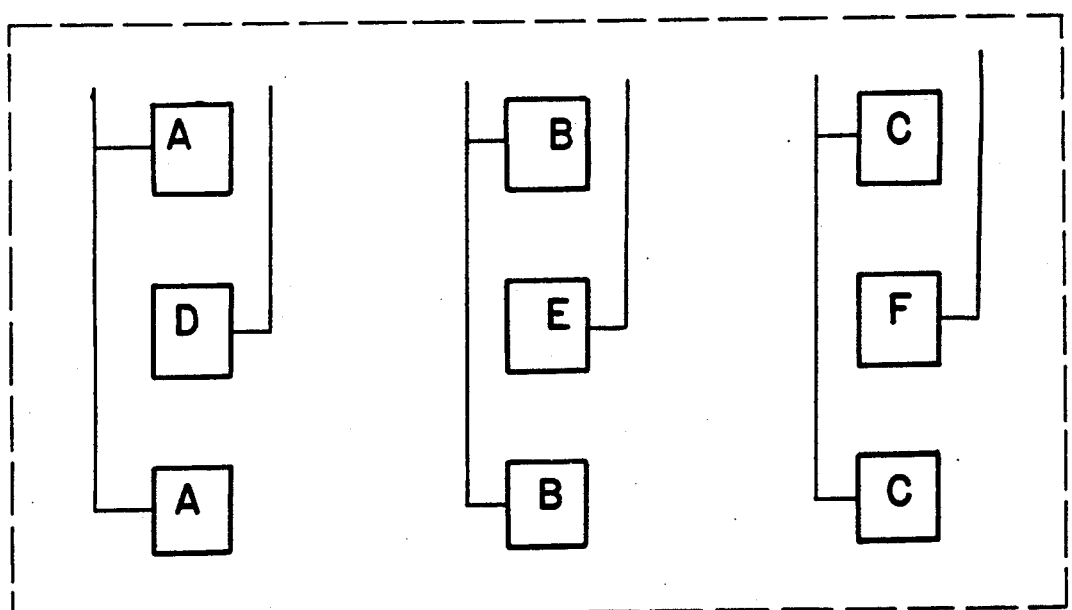
FIG. 4 is a diagram depicting the connections of the sensing elements of the writing pad of the system of FIG. 1A.

For operational convenience, the writing pad 3 may be a relatively large array having many more than 3×3 elements so that entry of the basic stroke elements for a character by the user may resemble the drawing of the character by the user on a writing surface. In one exemplary embodiment of the writing pad, the array of sensing elements is 9—9 which may permit the entry of most of the Chinese characters without requiring any row, column or diagonal of the array to be used for more than one stroke of the character. The connections for the sensing elements of a larger array are made in the same manner as shown in FIG. 4.

Figure 5C:
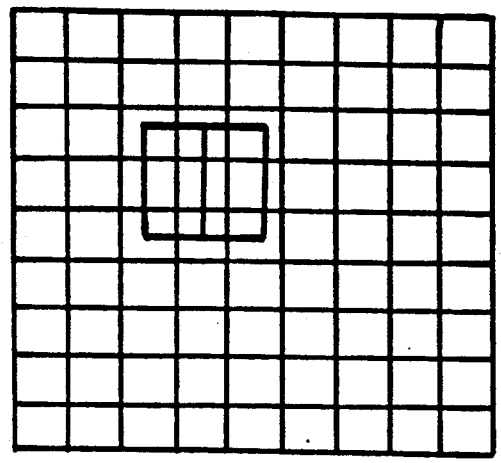
FIGS. 5a–5c are diagrams depicting three examples of using the writing pad of the system of FIG. 1A to enter a Chinese character.
Figure 5B:
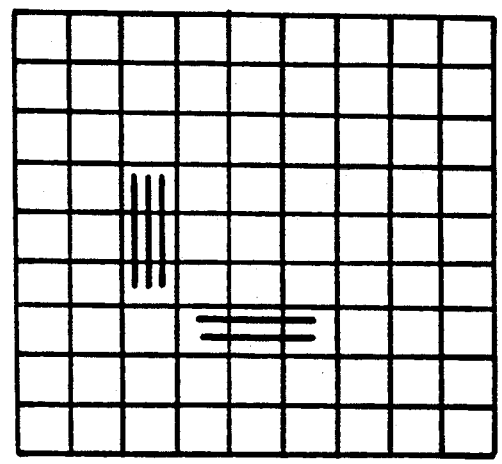
Figure 5A:
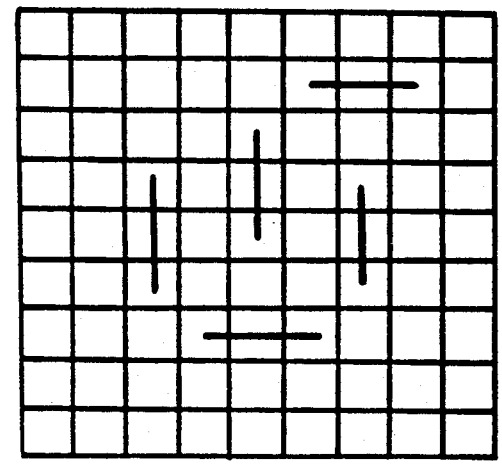

To encode or enter a character using the writing pad 3, the user may draw the character or the writing pad surface as if he or she were drawing the Chinese characters using a writing instrument on a writing surface, as shown in FIG. 5C using the character for the word "sun" 日 as an example. However, to enter a character using the writing pad it is not necessary to actually draw the character on the array of sensing elements. The user need only draw all the basic stroke elements of the character anywhere on the writing pad surface, as shown in FIGS. 5A and 5B. The basic strokes may be drawn in any order, so long as the initial order in which the different basic stroke element types are drawn is consistent with the basic stroke element sequence converted from the stroke element sequence of the character in accordance with the Chinese writing rules. As discussed above, a basic horizontal stroke element —is entered by activating three or more horizontally continuous sensing elements on the writing pad surface. A basic vertical stroke element | is entered by activating three or more vertically contiguous sensing elements, and a basic slant stroke element / may be entered by activating three or more diagonally contiguous sensing elements or fewer than two contiguous sensing elements. As shown in FIG. 5B, the same group of sensing elements may be used more than once to enter plural occurrences of the same type of basic stroke.

For the example of the character for the word "sun" 日, the strokes and stroke element sequence according to the Chinese handwriting rules is |ㄱ--. As explained above, the complex stroke may be converted to the basic stroke elements sequence —|. Therefore, the sequence of basic stroke elements for the character is |—|——, in which the initial order of occurrence of the different types of basic stroke elements is |—, and there are two occurrences of the vertical stroke element |, three occurrences of the horizontal stroke element— —and no occurrences of the slant stroke element /. Accordingly, to enter the character 日 using the writing pad 3, the user may draw in sequence the vertical stroke element | followed by the basic horizontal stroke —, and then draw the remaining basic stroke elements for this character in any order. Each basic stroke element may be drawn anywhere on the writing pad, and basic stroke elements of the same type may be superimposed on one another by activating the same group of sensing elements, as shown in FIG. 5B.

FIGS. 5A, 5B and 5C show three examples of how the character for the word "sun" (日) may be entered into the system of FIG. 1A using the writing pad 3. The computer 1 and its program responds to the output signals from the sensing elements of the writing pad 3 as the basic stroke elements for the character are drawn, and generates a character stroke code 2|3—0/ corresponding to the basic stroke elements as drawn. This code is displayed on the CRT screen 4 along with each character of the character set stored in the computer 1 which correspond to the character stroke code. The character stroke code indicates that the character has an initial basic stroke element order of |—/, with two vertical stroke elements, three horizontal stroke elements, and no slanted stroke elements. The use of the writing pad 3 is advantageous for the user who is composing Chinese text rather than transcribing text from a document, since such a user may simply draw each character that he or she desires to enter into the system of FIGS. 1A, 1B and 1C. The character being entered may be selected or verified from that which is displayed on the CRT screen 4 when the drawing of the character is completed.

This invention is further described by the following examples, which are not meant to limit the invention in any way.

EXAMPLE 1

This example demonstrates five different techniques for entering and encoding the Chinese character for the word "earth" (土) using the keys from the keyboard 2. The assignment of roots, strokes and stroke grouping are as depicted in FIG. 6 and specified (except for the assignment of the keys in row r4 for the S Mode) in the table of FIG. 12. At start-up, the program in the computer 1 causes a menu of the different entry modes provided by the program to be displayed on the screen of the CRT 4. The user may select any one of the entry modes by pressing an appropriate key on the keyboard. The various techniques for entering a character in the exemplary embodiment of FIGS. 1A, 1B and 1C are as follows:

A. The character is completely converted into basic stroke elements, which are then entered in the sequence dictated by the Chinese handwriting rules. To use this technique, the user selects the "typing" mode by pressing the "T" key on the keyboard. In this mode, all the keys in rows r1-r4 are available for entering strokes and roots.

B. The character is decompose<into a ROOT and one or more roots, strokes, and/or stroke equivalents, which are then entered in accordance with the Chinese handwriting rules. This technique also requires the user to be in the "typing" mode.

C. The character is completely converted into basic stroke elements, which are then entered as stroke groupings in accordance with the sequence dictated by of the Chinese handwriting rules. For this technique the user enters the "Stroke Grouping" mode by pressing the "S" key on the keyboard 2. In this mode, only the numerical keys in row r4 are used to enter the appropriate stroke groupings of each type of basic stroke element.

D. The user visually analyzes the character to be entered and derives the character stroke code for the character by determining the initial order of occurrence of the different types of basic stroke elements and counting the occurrence of each of the basic stroke element types. The character stroke code derived in this manner is entered directly into the computer 1 via the keyboard 2. To use this technique, the user selects the "Memory" mode by pressing the "M" key when the menu of available entry modes is displayed. In this mode, the keys of the keyboard 2 are usable for entering corresponding alphabetic letters, numerals and special symbols only.

E. The user memorizes the full codes which uniquely correspond to the characters he or she wishes to enter, and enters the full character stroke codes for the characters directly into the computer 1. To use this technique the user must also select the "Memory" mode.

The following are examples illustrating the use of the foregoing techniques to enter the character for the word "earth" (土), the character for the word "also" (也) and the character for the word "forest" (森).

Using technique A to Enter the Character 土.

When the menu of available entry modes is displayed on the CRT screen 4, the user selects the "Typing" mode. The strokes of the character 土 in the sequence dictated by the Chinese handwriting rules are —|—. Because these are all simple strokes which may be directly converted to corresponding basic stroke element sequence —|—, no conversion of complex or compound strokes is needed. To enter the character 土, the user first presses the ";" key, then presses the "]" key, and finally presses the ";" key again to enter the basic stroke element sequence —|—. After completing the entry of the basic stroke element sequence, the user presses the "''" key, which causes the program to generate a character stroke code 2—1|0/ indicating that an initial order of occurrence of basic stroke element types of —|/ with two occurrences of the —stroke element, one occurrence of the | stroke element and no occurrence of the / stroke. The program also causes the character stroke code derived from the input strokes to be displayed on the screen of the CRT 4.

Figure 13A:
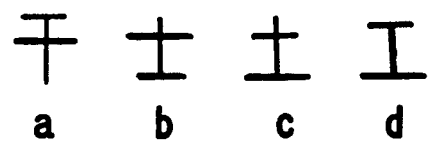
FIG. 13A illustrates a display of all characters corresponding to the character stroke code 2—1|0/ in the stored character set and the additional code element associated with each displayed character in accordance with the embodiment of FIGS. 1A, 1B and 1C.

If the user is satisfied with the character stroke code as displayed on the CRT screen, he or she then presses the "ENTER" key (not shown in FIG. 6) to cause the program to display a character stroke code, along with each character in the character set in the memory which correspond to the character stroke code, as shown in FIG. 13A.

Because the character stroke code 2—1|0/ corresponds to four characters in the stored character set, these four characters are all displayed on the CRT screen 4. Displayed with each character is an associated alphabetic letter (additional code element). The user selects from the displayed characters the one which is being entered and presses the key for the letter associated with the selected character. The associated letter is then appended to the character stroke code to provide an extended character stroke code 2—1|0/c which uniquely corresponds to the character being entered.

Figure 13B:
FIG. 13B illustrates the extended code corresponding to the desired character to be encoded or entered in accordance with the embodiment of FIGS. 1A, 1B and 1C.

In the present example, the character 土 is displayed (see FIG. 13A) with an associated letter c. Therefore, the user presses the "c" key on the keyboard to cause the program to generate a full character stroke code 2—1|0/c which uniquely corresponds to the character 土, and then presses the "ENTER" key (not shown in FIG. 6) to store the full code in a buffer. The display on the CRT screen 4 is changed from that of FIG. 13A to that shown in FIG. 13B, in which only the character 土 is displayed, and the program returns to an input routine ready for entry of another character.

If the user had not been satisfied with the character stroke code or the characters corresponding thereto after completion of stroke entry, he or she would press the " \ " key (not shown in FIG. 6). Pressing the " \ " key cancels all previous stroke entries and allows the user to re-enter the stroke data for the character he or she desired to enter. In this manner, the user may visually verify each character stroke code before the stroke entry process for a character is completed.

Using Technique B to Enter the Character 土

When the menu of available entry modes is displayed on the screen of the CRT 4, the user presses the "T" key to select the "Typing" mode. Since the ROOT 土 is represented by the "s" key of the keyboard 2, as shown in FIGS. 6 and 12, the user presses the "s" key, and then the """ key to cause the program of the computer 1 to generate and display the character stroke code 2—1|0/. The procedure thereafter for obtaining and storing the full character stroke code 2—1|0/c which uniquely corresponds to the character 土 is the same as that described above for entry of that character using technique A.

Using Technique C to Enter the Character 土

When the menu of available entry modes is displayed on the screen of the CRT 4, the user presses the "S" key to select the "Stroke Grouping" mode. The character for the word "earth" has two —stroke elements and one | stroke element. The basic stroke element sequence of —|— as obtained by stroke conversion is in accordance with the Chinese handwriting rules which dictate a stroke element sequence of -ı- for the character 土. In the Stroke Grouping mode, the user presses the "2" key which represents a group of two horizontal — stroke elements, the "5" key which represents one vertical stroke elment |, and the """ key to cause the program of the computer 1 to generate and display on the CRT 4 the character stroke code 2—1|0/. The procedure thereafter for obtaining and storing the extended character stroke code 2—1|3/c which uniquely corresponds to the character 土 is the same as described above for entry of that character using technique A.

Using Technique D to Enter the Character 土

When the menu of available entry modes is displayed on the screen of the CRT 4, the user presses the "M" key to select the "Memory" mode. Through visual inspection of the character 土, the user determines the initial order of occurrence of the different types of basic stroke elements and the number of occurrence of each type of basic stroke element to mentally derive the character stroke code 2—1|0/. It is noted that although there is no slant stroke in the character 土, the code elements "0/" must be added to the character stroke code to conform to the character stroke code format called for by the program. The character stroke code 2—1|0/ is then entered directly on the keyboard by pressing the "2", "-", "1", "1", "0", "/" and """ keys in sequence. After such entry, the character stroke code is displayed on the CRT screen 4. The subsequent procedure for obtaining and storing the extended character stroke code 2—1|3/c which uniquely corresponds to the character 土 is the same as described above for the entry of that character using technique A.

Using Technique E to Enter the Character 土

After selecting the "Memory" mode in the manner set forth above, the user enters on the keyboard from memory the full code for the character.

It is noted that the format of a character stroke code for a character as required by the program must have all three basic stroke element types present, even though the number of occurrences of one or two of the basic stroke element types may be zero. However, where the character stroke code uniquely corresponds to a character, the additional code element in the form of an appended alphabetic letter is not present in the full character stroke code.

Using Technique A to Enter the Character 也

The "Typing" mode is first selected by the user in the manner described above. The strokes and stroke element sequence as dictated by the Chinese handwriting rules are 刁丨乚. The first stroke 刁 is a complex stroke which according to the table in FIG. 10 may be decomposed into the basic stroke element sequence —|/. The third stroke 乚 is also a complex stroke which may be decomposed into the basic stroke element sequence |—|. Accordingly, the basic stroke element sequence for the character 也 is —|/||—|. This sequence may be entered on the keyboard 2 by pressing in sequence the ";", "]", "=", "]", ";" and "]" keys.

The """ key may then be pressed to cause the program in the computer 1 to generate the character stroke code 2—4|1/ and to display the same code on the screen of the CRT 4. If the user is satisfied with the displayed character stroke code, he or she may press the "ENTER" key (not shown in FIG. 6) to cause the program to display on the CRT screen each character in the stored character set which corresponds to the character stroke code. If more than one character is displayed, a respective alphabetic letter associated with each one of the displayed characters also appears on the CRT screen 4. The user then selects the character 也 from the ones being displayed and enters on the keyboard 2 the letter corresponding to that character to cause the program to generate and store an extended character stroke code uniquely corresponding to the character Using Technique B to Enter the Character 也

The three strokes of the character 也 are represented by the "d", "]" and "w" keys on keyboard 2, respectively. Since the stroke 刁 when converted to a sequence of basic stroke elements includes all three basic stroke element types, once this stroke is entered, the remaining strokes may be entered in any order. After entry of the strokes the user presses the """ key to cause the program to generate a character stroke code 2—4|1/ and to display such code on the screen of the CRT 4. The remainder of the procedure for obtaining and storing the extended character stroke code which uniquely corresponds to the character 也 is the same as previously described in connection with technique B.

Using Technique A to Enter the Character 森

The character 森 includes three identical roots ✦. Since all three roots are identical, the order in which they are entered is indistinguishable one from the other. Each root is entered by the operator pressing in sequence the ";", "]", "=" and "=" keys. To enter the remaining two roots, the foregoing key depression is repeated two more times. After all the strokes have been entered, the user generate the character stroke code 3—3|6/ and to display the character stroke code on the screen of the CRT 4. The remainder of the procedure for obtaining and storing the full code for the character 

is the same as previously described in connection with technique B.

Using Technique B to Enter the Character 

As mentioned above the character 

has three identical roots ✦. According to FIG. 6 and the table of FIG. 12, the root ✦ is represented by the "g" key. Because this root when decomposed into basic stroke elements contains all three basic stroke element types, the character 

may be entered by pressing the "g" key three times. Thereafter, the user may press the """ key to cause the program in the computer 1 to generate the character stroke code 3—3|6/ and to display such code on the screen of the CRT 4. The rest of the procedure for obtaining and storing a full character stroke code which uniquely corresponds to the character is the same as previously described in connection with technique B.

Using Technique C to Enter the Character 

According to the Chinese handwriting rules, each of the three identical roots of the character 

has the stroke element sequence ·ı⌒. Since these are all simple strokes, they may be converted to the basic stroke element sequence —|//. Accordingly, to enter the character 

using stroke groupings, the operator presses in sequence the "3" key for three horizontal stroke elements ———, the "7" key for three vertical stroke elements |||, the "=" key for four slant stroke elements //// and the "0" key for two more slant stroke elements //. The latter two keystrokes may be substituted by the two successive pressings of the "—" key for three slant stroke elements /// each. After the foregoing stroke entry sequence, the user presses the """ key to cause the program of the computer 1 to generate the character stroke code 3—3|6/ and to display such code on the screen of the CRT 4. The rest of the procedure for obtaining and storing a full character stroke code uniquely corresponding to the character 

is the same as previously explained for technique B.

For Chinese characters with strokes numbering less than 10, technique D may be advantageous For Chinese characters with strokes numbering less than 15 and whose conversion to basic stroke elements can be easily recognized, technique C may be advantageous. For Chinese character with strokes numbering more that 15 and whose conversion to basic stroke elements cannot be easily recognized, technique B may be generally more effective.

In accordance with the present invention each Chinese character in the stored character set has its strokes encoded according to shape and size. The size of a given type of stroke depends upon location and number of strokes in the Chinese character. A stroke is to a first approximation a line whose length is determined by its end points. These end points may be defined by two-dimensional cartesian coordinates x1, y1 and x2, y2 based on some appropriate origin. The coordinate values may be encoded or entered from the keyboard 2. The computer 1 stores the coordinate data for each stroke of the Chinese character and derives a code according to the number and stroke element type. The coordinate data and the code are then stored in the memory of the computer 1.

The following is an outline of an example of how data for the character for the word earth  is derived and incorporated in the character font:

1. Determine the size of the Chinese character desired.

Figure 7:
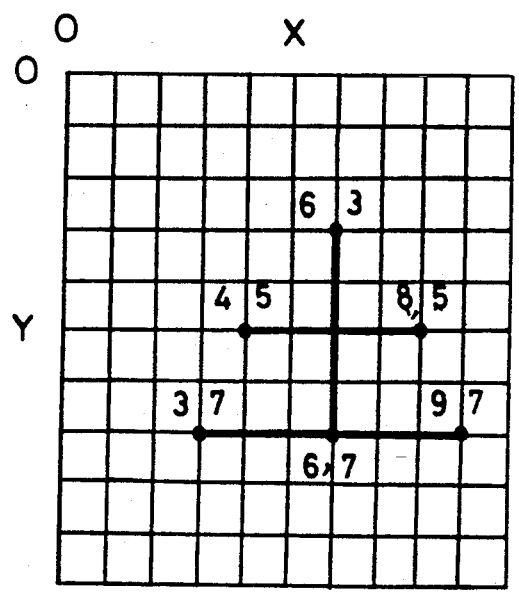
FIG. 7 illustrates the use of the keyboard of the system of FIG. 1A to enter Chinese characters by entering the coordinates of the strokes of such characters.

2. Write the Chinese character on graph paper, as shown in FIG. 7.

3. Encode or enter the coordinate values for each stroke from the keyboard (2). In this example, the coordinate values for the end points of horizontal stroke element 1 are (4, 5); (8, 5); the coordinate values for the end points of vertical stroke element 2 are (6, 3); (6, 7); and the coordinate values for horizontal stroke element 3 are (3, 7); (9, 7).

4. After finishing all entries, the character stroke code 2—1|0/ is displayed on the screen of the CRT 4. By pressing the """ key, the coordinate values for the end points of each stroke element and the character stroke code for the character are stored in memory.

5. Enter the last code element of the code to uniquely define the character. In this case the full character stroke code is 2—1|0/c.

It will be understood that each of the elements described above, or two or more together, may also find a useful application other types of constructions differing from the type described above.

While the invention has been illustrated and described in terms of specific exemplary embodiments of an apparatus and method for encoding and decoding Chinese characters, it is not intended to be limited to the details shown or described, since it will be understood by those skilled in the art that various omissions, modifications, substitutions and changes in the forms and details of the embodiments illustrated and their operation can be made without departing in any way from the spirit of the present invention or the scope thereof as defined by the appended claims.

I claim:

1. An apparatus for encoding and decoding Chinese characters comprising:
   (a) entry means for entering a sequence of one or more basic stroke elements into which the stroke or strokes of a corresponding Chinese character being entered are decomposed in a sequence conforming at least initially to Chinese handwriting rules, the basic stroke elements being of only three types, namely, a horizontal stroke element —, a vertical stroke element | and a slant stroke element /;
   (b) processing means responsive to the entry by the entry means of the sequence of one or more basic stroke elements corresponding to the character being entered for deriving a character stroke code indicative of the order of initial occurrence of different types of the basic stroke elements and the total number of occurrences of each basic stroke element type in the sequence of one or more basic stroke elements, the processing means including memory means for storing a character set comprising a multiplicity of Chinese characters each corresponding to a respective character stroke code;
   (c) display means responsive to the processing means for displaying each character of the character set corresponding to the character stroke code derived by the processing means, wherein the entry means includes means for selecting one of the characters being displayed on the display means if the character stroke code derived by the processing means correspond to more than one character of the character set and the processing means is further responsive to the means for selecting one of the characters being displayed for deriving an extended character stroke code which uniquely corresponds to a selected one of the characters being displayed.

2. An apparatus for encoding and decoding Chinese characters according to claim 1, wherein the processing means comprises a programmed computer.

3. An apparatus for encoding and decoding Chinese characters according to claim 1, wherein the processing means includes means responsive to a character stroke code derived by the processing means which does not correspond to any character of the character set for causing the display means to display a message indicating that the character being entered should be re-entered.

4. An apparatus for encoding and decoding Chinese characters according to claim 1, wherein the entry means includes a writing pad having a multiplicity of sensing elements arranged in a regular array having a multiplicity of rows and a multiplicity of columns, each one of the sensing elements being individually actuable, and wherein the processing means includes means responsive to the actuation of three or more horizontally contiguous sensing elements for providing a stroke code corresponding to the entry of the horizontal basic stroke element —, means responsive to the actuation of three or more vertically contiguous sensing elements for providing a stroke code corresponding to the entry of the vertical basic stroke element —, and means responsive to the actuation of three or more diagonally contiguous sensing elements or the actuation of fewer than two contiguous sensing elements for providing a stroke code corresponding to the entry of the slant basic stroke element /.

5. An apparatus for encoding and decoding Chinese characters according to claim 1, wherein the entry means includes means for entering individual sequences of one or more basic stroke elements into which the stroke or strokes of one or more roots of the Chinese character being entered are decomposed in respective sequences conforming at least initially to Chinese handwriting rules.

6. An apparatus for encoding and decoding Chinese characters according to claim 1, wherein the display means is responsive to the processing element for displaying a respective additional code element associated with each displayed character if the character stroke derived by the processing means corresponds to more than one character of the character set and wherein the means for selecting one of the characters being displayed on the display means comprises means for entering the additional code element associated with one of the characters being displayed.

7. An apparatus for encoding and decoding Chinese characters according to claim 1, wherein the entry means includes means for entering a character stroke code indicative of the order of initial occurrence of different types of basic stroke elements and the total number occurrences of each basic stroke element type in a sequence of one or more basic stroke elements into which the strokes of a corresponding Chinese character being entered are decomposed in a sequence conforming at least initially to the Chinese handwriting rules, and wherein the processing means is responsive to the character stroke code entered by the entry means for causing the display means to display each character of the character set corresponding to the entered character stroke code.

8. An apparatus for encoding and decoding Chinese characters according to claim 1, wherein the entry means comprises a keyboard having a different key corresponding to each type of basic stroke element, the keyboard being responsive to the actuation of a key corresponding to a basic stroke element type for providing a respective stroke code representative of the corresponding basic stroke element type, and wherein the processing means is responsive to the respective stroke code for deriving a partial character stroke code indicative of a single occurrence of the corresponding basic stroke element type.

9. An apparatus for encoding and decoding Chinese characters according to claim 8, wherein the keyboard includes a multiplicity of keys each corresponding to one or more roots or strokes decomposable into a common sequence of basic stroke elements, the keyboard being responsive to the actuation of a key corresponding to a root or a stroke for providing a respective stroke code representative of a sequence of one or more basic stroke elements into which the corresponding root or stroke is decomposable in a sequence conforming at least initially to Chinese handwriting rules, and wherein the processing means is responsive to the respective stroke code for deriving a partial character code indicative of the order of initial occurrence of different types of basic stroke elements and the total number of occurrences of each basic stroke element type in the sequence of one or more basic stroke elements represented by the respective stroke code.

10. An apparatus for encoding and decoding Chinese characters according to claim 9, wherein the keyboard further includes different keys corresponding to different groupings of each type of basic stroke element, the keyboard being responsive to the actuation of a key corresponding to a particular one of the different groupings of a basic stroke element type for providing a respective stroke code representative of the particular one of the groupings of a basic stroke element type, and wherein the processing means is responsive to the respective stroke code for deriving a partial character code indicative of the number and type of basic stroke element in the particular one of the groupings of a basic stroke element type represented by the respective stroke code.

11. An apparatus for encoding and decoding Chinese characters according to claim 9, wherein each partial character code derived by the processing means in response to a respective stroke code provided by the keyboard includes a respective code element corresponding to each of the three types of basic stroke elements, even where there are no occurrences of one or more types of basic stroke elements in the one or more roots or strokes, or the basic stroke element type, corresponding to the actuated key.

12. An apparatus for encoding and decoding Chinese characters according to claim 8, wherein the processor means is responsive to a sequence of one or more stroke codes provided by the keyboard for deriving a cumulative character stroke code indicative of the order of initial occurrence of each type of basic stroke element and the total number of occurrences of each basic stroke element type represented by the sequence of one or more stroke codes provided by the keyboard in response to the actuation of one or more keys.

13. An apparatus for encoding an decoding Chinese characters according to claim 12, wherein the display means is responsive to the processing means for displaying the cumulative stroke code.

14. An apparatus for encoding and decoding Chinese characters according to claim 1, wherein the character code or extended character code each include a respective code element corresponding to each of the three types of basic stroke elements, even where there are no occurrences of one or more types of basic stroke elements in sequence of basic stroke elements into which the stroke or strokes of the corresponding character being entered is decomposed.

15. An apparatus for encoding and decoding Chinese characters according to claim 1, wherein the processing means includes means responsive to the entry by the entry means of basic stroke elements of two different types for causing the display means to display a message indicating that any remaining strokes of the corresponding character being entered may be decomposed into basic stroke elements and entered in any arbitrary sequence.

16. An apparatus for encoding and decoding Chinese characters according to claim 15, wherein the entry means comprises a keyboard having a multiplicity of keys each corresponding to one or more roots or strokes decomposable into a common sequence of one or more basic stroke elements in a sequence conforming at least initially to Chinese handwriting rules, or one of the basic stroke element types, each key for entering a sequence of one or more basic stroke elements into which the corresponding root or stroke is decomposable, or for entering a basic stroke element, by actuation thereof, and wherein after the processing means causes the display means to display the message indicating that any remaining strokes of the corresponding character being entered may be decomposed into basic stroke elements and entered in any arbitrary sequence, a remaining root or stroke of the character not corresponding to any of the keys of the keyboard may be entered by actuating a key corresponding to a root or stroke which is stroke equivalent to the remaining root or stroke.

17. A method for encoding and decoding Chinese characters comprising the steps of:
(a) entering a sequence of one or more basic stroke elements representing a decomposition of the stroke or strokes of a Chinese character being encoded in a sequence conforming at least initially to Chinese handwriting rules, the basic stroke elements of the sequence being of only three types, namely, a horizontal stroke element —, a vertical stroke element | and a slant stroke element /;
(b) deriving from the entered sequence of one or more basic stroke elements a character stroke code indicative of the order of initial occurrence of each type of basic stroke element and the total number of occurrences of each one of the basic stroke element types in the entered sequence of basic stroke elements;
(c) retrieving from a stored character set one or more characters corresponding to the character stroke code, the stored character set comprising a multiplicity of Chinese characters each corresponding to a respective character stroke code;
(d) displaying each character corresponding to the character stroke code retrieved from the stored character set;
(e) selecting the character being entered from the characters being displayed if more than one character of the character set corresponds to the character stroke code; and
(f) modifying the character stroke code to include an additional code element associated with the selected character to obtain an extended character stroke code uniquely corresponding to the selected character if more than one character of the character set corresponds to the character stroke code.

18. A method for encoding and decoding Chinese characters according to claim 17, wherein the step of entering the sequence of one or more basic stroke elements representing a decomposition of the stroke or strokes of a Chinese character being encoded includes sequentially entering one or more sequences of basic stroke elements respectively representing one or more roots or strokes of the Chinese character being encoded, the sequences of basic stroke elements representing the roots or strokes the character being entered in a sequence conforming at least initially to Chinese handwriting rules.

19. A method for encoding and decoding Chinese characters according to claim 17, wherein the sequence of one or more basic stroke elements being entered represents the decomposition of the stroke or strokes of the Chinese character being encoded in a sequence conforming to Chinese handwriting rules until basic stroke elements of two different types have been entered and may represent the decomposition of the stroke or strokes of the character in any sequence after basic stroke elements of two different types have been entered.

20. A method for encoding and decoding Chinese characters according to claim 17, wherein the step of entering a sequence of one or more basic stroke elements representing a decomposition of the stroke or strokes of the Chinese characters being encoded includes entering basic stroke elements of the sequence using a keyboard having a different key corresponding to each type of basic stroke element.

21. A method for encoding and decoding Chinese characters according to claim 17, wherein the step of entering a sequence of one or more basic stroke elements representing a decomposition of the stroke or strokes of the Chinese character being encoded includes entering one or more roots or strokes of the character using a keyboard having a multiplicity of keys each corresponding to one or more roots or strokes decomposable into a common sequence or one or more basic stroke elements in a sequence conforming at least initially to Chinese handwriting rules.

22. A method for encoding and decoding Chinese characters according to claim 17, wherein the step of selecting the character being entered from the characters being displayed includes using a keyboard to enter the additional code element associated with the character being selected.

* * * * *

UNITED STATES PATENT AND TRADEMARK OFFICE
CERTIFICATE OF CORRECTION

PATENT NO. : 5,212,769
DATED : May 18, 1993
INVENTOR(S) : Gim Pong

It is certified that error appears in the above-indentified patent and that said Letters Patent is hereby corrected as shown below:

Col. 1, bridging lines 17-18, "occurrence" should read -- occurrences --; line 37, "26th" should read -- (26th --. Col. 4, line 25, "occurrence" should read -- occurrences --; line 52, "occurrence" should read -- occurrences --. Col. 5, line 29, "handwriting/rules" should read -- handwriting rules --. Col. 6, line 64, "element, the Latter" should read -- element. The latter --. Col. 7, line 8, "thereof" should read -- thereof, --; line 14, "back-slant /" should read -- back-slant \ --; line 18, "dot" should read -- do --; line 19, "to" should read -- to a --; line 36, "stroke portions" should read -- strokes or stroke portions --; line 45, "stroke portions" should read -- strokes or stroke portions --; line 51, "stroke" should read -- strokes --; line 56, " "—41 —13" should read -- |— |— —, --; line 58, " "—/ " should read -- |—/ --; line 67, " —"—, " should read -- —|—, --.

UNITED STATES PATENT AND TRADEMARK OFFICE
CERTIFICATE OF CORRECTION

PATENT NO. : 5,212,769   Page 2 of 3
DATED : May 18, 1993
INVENTOR(S) : Gim Pong It is certified that error appears in the above-indentified patent and that said Letters Patent is hereby corrected as shown below:

Col. 8, line 1, " —"/ " should read -- —|/ --. Col. 9, line 13, "strokes" should read -- stroke elements --; line 18, "occurrence" should read -- occurrences --; line 38, "Y—X|z/*" should read -- Y—X|Z/* --; line 39, delete "Z/X|*,"; line 42, "elements" should read -- element --. Col. 10, line 5, "occurrence" should read -- occurrences --. Col. 12, line 19, "strokes" should read -- stroke elements --; line 24, "stroke" should read -- strokes --; line 63, "or stroke" should read -- a stroke --. Col. 13, line 36, "1—2/1" " should read -- 1—2/1| --,; line 51, "number" should read -- number of --; line 60, "strokes" should read -- stroke elements --. Col. 14, line 8, "yields ..." should follow immediately after the word "code" on the preceding line. Col. 15, bridging lines 8-9, "the other of two" should read -- of the other two --; line 12, "|—|—|" should read -- |—|—|— --; line 13, delete "⌐ "; "line 29, "grounding" should read -- grouping --.

UNITED STATES PATENT AND TRADEMARK OFFICE
CERTIFICATE OF CORRECTION

PATENT NO. : 5,212,769

DATED : May 18, 1993

INVENTOR(S) : Gim Pong

It is certified that error appears in the above-indentified patent and that said Letters Patent is hereby corrected as shown below:

Col. 16, line 11, "9--9" should read -- 9x9 --; bridging lines 34-35, "continuous" should read -- contiguous --; line 48, "elements" should read -- element --; line 57, "stroke" should read -- stroke element --. Col. 17, line 45, "decompose < into" should read -- decomposed into --; line 53, "of the" should read -- the --. Col. 18, line 35, first occurrence, "stroke" should read -- stroke element --. Col. 20, line 5, "character." should read -- character 土. --; bridging lines 20-21, delete "element"; line 47, "character" should read -- character 竹 . --. Col. 21, line 7, "user" should read "user presses the "'" key to cause the program in the computer 1 to --. Col. 22, line 66 "other" should read -- of other --. Col. 23, line 42, "correspond" should read -- corresponds --. Col. 24, line 4, "element —" should read -- element | --; line 20, "element" should read -- means --; line 22, "stroke" should read -- stroke code --; line 34, "number" should read -- number of --. Col. 25, line 32, "processor" should read -- processing --; line 41, "an decoding" should read -- and decoding --. Col. 26, line 60, "strokes" should read -- strokes of --.

Signed and Sealed this

Twenty-third Day of September, 1997

BRUCE LEHMAN

*Attest:*

*Attesting Officer*   Commissioner of Patents and Trademarks